United States Patent
Lane et al.

(10) Patent No.: US 11,308,021 B2
(45) Date of Patent: Apr. 19, 2022

(54) METHODS AND APPARATUS FOR USING AN ADDRESSABLE SERIAL PERIPHERAL INTERFACE

(71) Applicant: Mixcomm, Inc., Chatham, NJ (US)

(72) Inventors: Frank Lane, Easton, PA (US); Enkhbayasgalan Gantsog, Newark, NJ (US)

(73) Assignee: Mixcomm, Inc., Chatham, NJ (US)

(*) Notice: Subject to any disclaimer, the term of this patent is extended or adjusted under 35 U.S.C. 154(b) by 0 days.

(21) Appl. No.: 16/879,682

(22) Filed: May 20, 2020

(65) Prior Publication Data
US 2021/0216492 A1 Jul. 15, 2021

Related U.S. Application Data

(60) Provisional application No. 62/960,103, filed on Jan. 12, 2020.

(51) Int. Cl.
*G06F 13/42* (2006.01)

(52) U.S. Cl.
CPC ................. *G06F 13/4282* (2013.01)

(58) Field of Classification Search
CPC .......... G06F 13/4282; G06F 13/4256
USPC .......... 710/3, 6, 8, 9, 10, 15, 33, 36, 46, 104
See application file for complete search history.

(56) References Cited

U.S. PATENT DOCUMENTS

| | | | | |
|---|---|---|---|---|
| 5,675,811 | A * | 10/1997 | Broedner | G06F 13/4291 710/104 |
| 6,408,334 | B1 * | 6/2002 | Bassman | G06F 13/4252 709/220 |
| 8,849,325 | B2 * | 9/2014 | Schreiber | H04M 1/00 455/500 |
| 2003/0101307 | A1 * | 5/2003 | Gemelli | G06F 30/30 710/305 |
| 2011/0289248 | A1 | 11/2011 | Djabbari et al. | |
| 2012/0166695 | A1 * | 6/2012 | Venus | G06F 13/4256 710/110 |
| 2013/0057339 | A1 * | 3/2013 | Koudar | G06F 13/4252 327/565 |
| 2013/0258906 | A1 * | 10/2013 | Rohatschek | H04L 12/437 370/255 |
| 2013/0297829 | A1 * | 11/2013 | Berenbaum | G06F 13/4256 710/3 |
| 2018/0034767 | A1 | 2/2018 | Mishra et al. | |

OTHER PUBLICATIONS

Notification of Transmittal of the International Search Report and the Written Opinion of the International Searching Authority, International Search Report and Written Opinion of the International Searching Authority from PCT/US2021/012947, dated Apr. 23, 2021, 12 pages.

\* cited by examiner

*Primary Examiner* — Idriss N Alrobaye
*Assistant Examiner* — Henry W Yu
(74) *Attorney, Agent, or Firm* — Straub & Straub; Michael P. Straub; Stephen T. Straub

(57) ABSTRACT

Devices in an array of devices, coupled to a common SPI bus, are automatically assigned identifiers by an enumeration process. In some embodiments, the devices are coupled together in an enumeration daisy chain. The enumeration function is initiated, e.g., by a controller, with a single SPI transaction.

16 Claims, 16 Drawing Sheets

| PIN NAME | DIRECTION | CONNECTION | FUNCTION |
|---|---|---|---|
| SPI_CSN | IN | EXTERNAL PAD | SPI CHIP SELECT, ACTIVE LOW |
| SPI_CLK | IN | EXTERNAL PAD | SPI CLOCK |
| SPI_DIN (MOSI_DATA) | IN | EXTERNAL PAD | SPI DATA INTO SLAVE FROM MASTER |
| SPI_DOUT (MOSI_DATA) | OUT | EXTERNAL TRI-STATE | SPI DATA OUT OF SLAVE TO MASTER |
| RESET_N | IN | EXTERNAL PAD | BLOCK RESET, ACTIVE LOW |
| BEAM_UPDATE | IN | EXTERNAL PAD | UPDATE BEAM INDEX LATCH |
| TR_SW_UPDATE | IN | EXTERNAL PAD | UPDATE TR SWITCH LATCH |
| CHIP_ID[5:0]<br>{CHIP_ID[0], CHIP_ID[1], CHIP_ID[3], CHIP_ID[4], CHIP_ID_[5]} | IN | EXTERNAL PAD | 6-BIT CHIP ID |
| ENUM_IN | IN | EXTERNAL PAD | ENUMERATION INPUT MULTIPLEXED WITH CHIP_ID[0] |
| ENUM_OUT | OUT | EXTERNAL PAD | ENUMERATION OUTPUT MULTIPLEXED WITH CHIP_ID[1] |

DIGITAL PINOUT DESCRIPTION
FIGURE 2

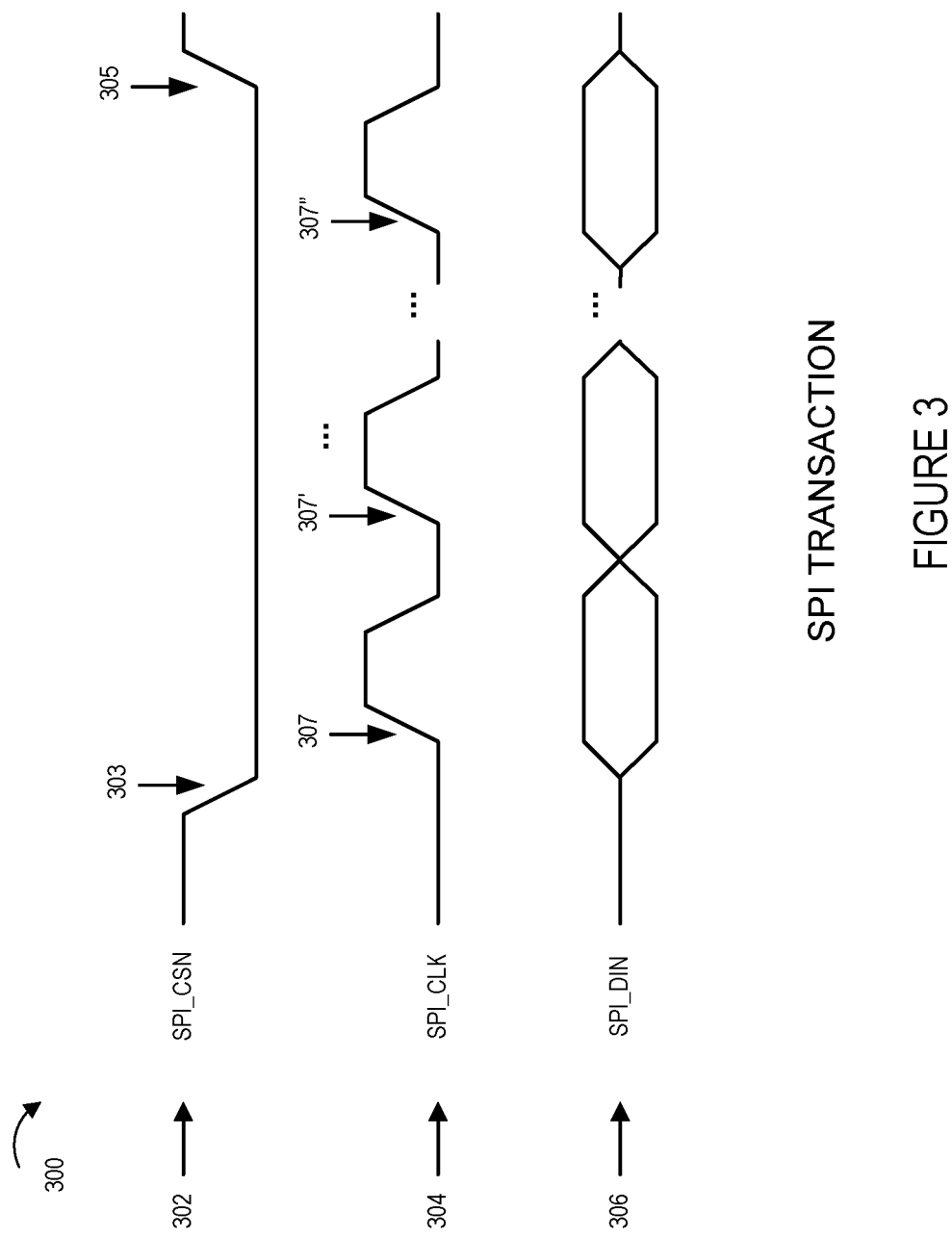

| BITS | NAME | DESCRIPTION |
|---|---|---|
| 0 | ID TYPE | 1 INDICATES 8 BITS CHIP ID ADDRESSING |
| 1-8 | CHIP ID[0:7] | CHIP IDENTIFIER PROGRAMMED BY TYING EXTERNAL PINS HIGH OR LOW |
| 9-15 | COMMAND[0:6] | SEE COMMAND TABLE (FIGURE 10) |
| 16-31 | PAYLOAD[0:15] | 16-BIT DATA PAYLOAD |

32-BIT TRANSACTION
FIGURE 4

| BITS | NAME | DESCRIPTION |
|---|---|---|
| 0 | ID TYPE | 0 INDICATES 32 BIT UNIQUE ID ADDRESSING |
| 1-32 | CHIP ID[0:31] | CHIP IDENTIFIER IS 32-BIT UNIQUE ID |
| 33-39 | COMMAND[0:6] | SEE COMMAND TABLE (FIGURE 10) |
| 40-55 | PAYLOAD[0:15] | 16-BIT DATA PAYLOAD |

56-BIT TRANSACTION
FIGURE 5

ARRAY INTERCONNECT WITH ENUMERATION – EACH BOX REPRESENTING A DEVICE IN THE ARRAY

ENUM PROCESS FLOW

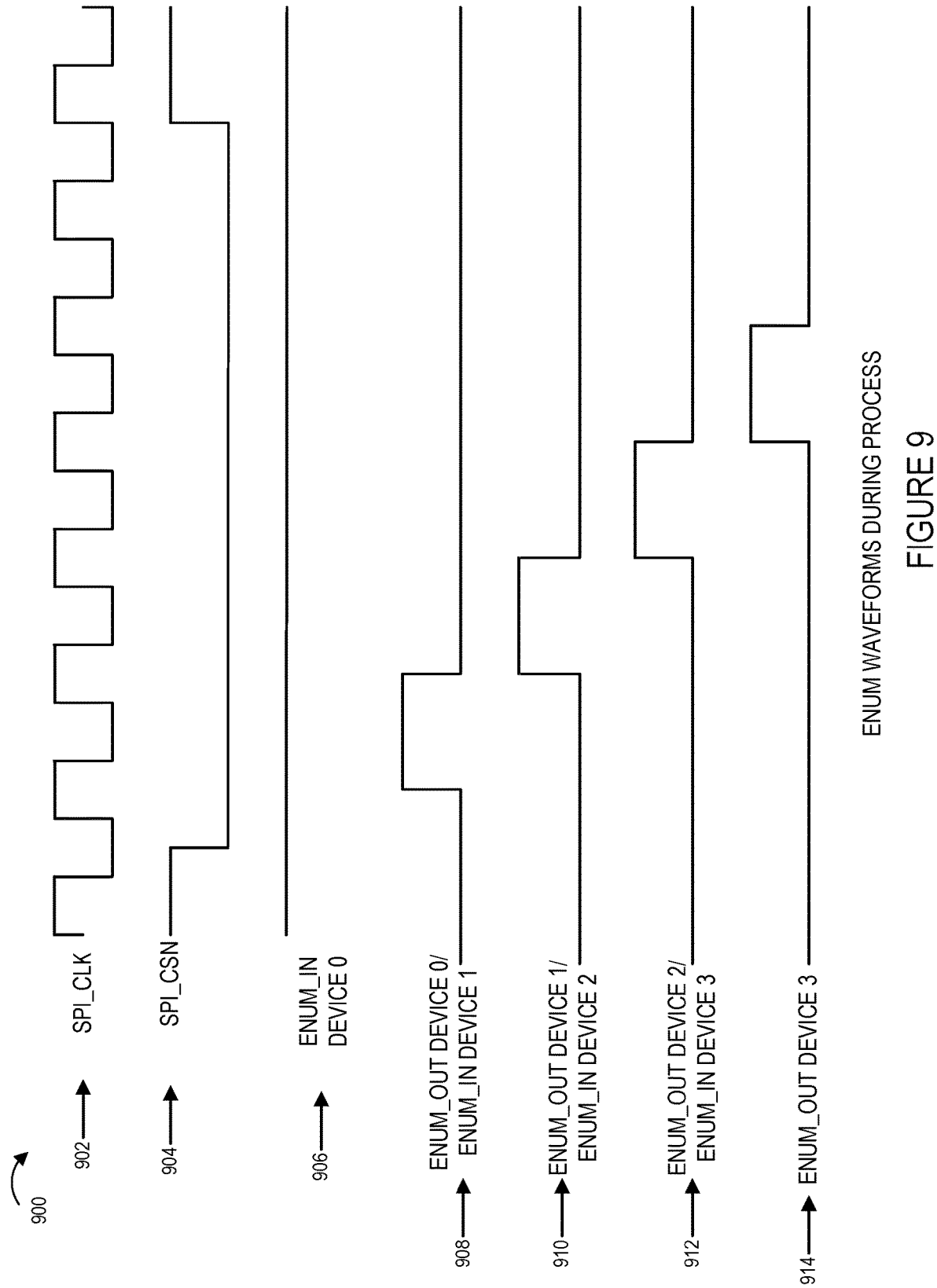

| COMMAND | VALUE | DESCRIPTION |
|---|---|---|
| LOAD_POINTER | 7'b0000000 | LOAD READ/WRITE ADDRESS POINTER FROM PAYLOAD |
| READ_REGISTER | 7'b0000001 | READ FROM ADDRESS POINTER LOCATION |
| WRITE_REGISTER | 7'b0000010 | WRITE TO ADDRESS POINTER LOCATION |
| WRITE_HTX_BEAM_IDX | 7'b0000100 | WRITE BEAM INDEX POINTER FOR TX H-POL |
| WRITE_VTX_BEAM_IDX | 7'b0000101 | WRITE BEAM INDEX POINTER FOR TX V-POL |
| WRITE_HRX_BEAM_IDX | 7'b0000110 | WRITE BEAM INDEX POINTER FOR RX H-POL |
| WRITE_VRX_BEAM_IDX | 7'b0000111 | WRITE BEAM INDEX POINTER FOR RX V-POL |
| ADC_CAPTURE | 7'b0001000 | INITIATE ADV SAMPLING |
| INIT_ENUM | 7'b0001001 | INITIATE ID ENUMERATION |
| SOFT_RESET_CMD | 7'b0001111 | RESET ALL CALIBRATION REGISTERS TO STORED VALUES |
| WRITE_SHORT_ID | 7'b0010000 | WRITE SHORT CHIP ID |
| RESERVED | 7'b1000000 | COMMANDS ABOVE THIS VALUE ARE RESERVED FOR FACTORY TEST |

SPI COMMANDS
FIGURE 10

TR STATE MACHINE

METHODS AND APPARATUS FOR USING AN ADDRESSABLE SERIAL PERIPHERAL INTERFACE

RELATED APPLICATIONS

The present application claims the benefit of U.S. Provisional Application Ser. No. 62/960,103 filed Jan. 12, 2020 which is hereby expressly incorporated by reference in its entirety.

FIELD

The present applications relates to methods and apparatus for implementing and using devices including a serial peripheral interface, e.g., in an array where the addresses of devices can be automatically assigned.

BACKGROUND

Serial Peripheral Interface, or SPI, is a communication interface specification commonly used in embedded systems. It works as a mater slave configuration with a clock, mosi_data (master-out-slave-in), and chip_select driven by the master and the miso_data (master-in-slave-out) driven by the slave.

For some applications, such as a phased array antenna, there may be many individual devices on a sub-system which are to be controlled by a common interface. Multiple slave devices can be connected on a common SPI buses. In typical implementations, where many devices are connected to a common SPI bus, a dedicated chip_select signal line from a master to a slave is used to indicate when the slave is being addressed by the protocol. Such an approach normally uses a separate chip_select signal line for each device in the subsystem that is to be controlled. However, it is desirable to control the entire sub-system through a signal SPI chip_select and for the entire array to appear as a single SPI interface. Providing individual chip_select lines for each device in a sub-system tends to create a large number of signal lines in the interface which can present a significant routing problem on a board on which the subsystem components are mounted. Accordingly such an approach is not practical for at least some applications where a large number of devices are to be controlled.

Based on the above discussion there is a need for new methods and apparatus for assigning addresses to devices which are to be controlled by a common interface.

SUMMARY

Various embodiments, in accordance with the present invention are directed to methods and apparatus which enables a SPI interface to have shared pins between multiple devices of a sub-system, allows for individual or broadcast addressing of devices, and/or establishes a method of automatically assigning addresses to devices.

A unique CHIP_ID is automatically assigned to each device coupled to a common SPI bus, e.g., where each device may be, and sometimes is, a device in an array. In various embodiments, in accordance with the present invention, chip identification values are assigned by the devices, e.g., in an array of devices, in response to an enumeration command. In some embodiments, an enumeration daisy chain is defined which allows for a chip designer to select an arbitrary length CHIP_ID without increasing the input-output (TO) demands on the chip interface. In some embodiments, the enumeration function is initiated with a single SPI transaction.

In some exemplary embodiments, two CHIP_ID input pins out of a set of 6 CHIP_ID input pins corresponding to an SPI interface, are repurposed to function as enumeration pins, an enumeration input pin and an enumeration output pin. Devices within the array of devices are daisy chained together with an enumeration output pin of one device being coupled to an enumeration input pin of a next device in the chain of devices. The remaining 4 CHIP_ID pins in the set of 6 CHIP_ID pins, which unused during the enumeration process, may be, and in some embodiments are, strapped to ground. This approach results in a simple layout as opposed to an approach wherein each device in the array has a unique set of strapping to logic high and logic low. The exemplary enumeration approach of automatic assignment allows for up to 255 devices in an array of devices to be assigned different addresses, allowing for an 8-bit address to be used in transaction messages.

An exemplary method of device identifier assignment, in accordance with some embodiments, comprises: detecting, at a first device in a daisy chain of devices, a signal (spi_csn signal=0) indicating the start of a serial peripheral interface (SPI) transaction; operating the first device to detect an amount of time between the start of the SPI transaction and a signal on a first identifier assignment pin (enum_in pin) of the first device; and determining, at the first device, the device identifier assigned to the first device based on the detected amount of time between the start of the SPI transaction and a signal on a first identifier assignment pin (enum_in pin) of the first device. An array of devices, in accordance with some embodiments, comprises: a first device including: a first input and output interface including i) a first input(e.g., spi_csn signal input) configured to receive a signal indicating a start of a serial peripheral interface (SPI) transaction, ii) a first identifier assignment pin and iii) a second identifier assignment pin; and a first processor configured to: detect a signal (spi_csn signal=0) communicated on the first input indicating the start of a serial peripheral interface (SPI) transaction; detect an amount of time between the start of the SPI transaction and a signal on a first identifier assignment pin (enum_in pin) of the first device; and determine the device identifier assigned to the first device based on the detected amount of time between the start of the SPI transaction and a signal on a first identifier assignment pin (enum_in pin) of the first device.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are discussed in the detailed description which follows.

BRIEF DESCRIPTION OF THE FIGURES

FIG. 2 is a drawing of a table illustrating an exemplary digital interface pinout in accordance with an exemplary embodiment.

FIG. 3 is a drawing illustrating the general structure for an exemplary SPI transaction.

FIG. 4 is a table illustrating the contents of an SPI transaction for a 32 bit transaction in accordance with an exemplary embodiment.

FIG. 5 is a table illustrating the contents of an SPI transaction for a 32 bit transaction in accordance with an exemplary embodiment.

FIG. 9 is a drawing which illustrates waveforms during the ENUM process of FIG. 8 for a 4-daisy chain example in accordance with an exemplary embodiment.

FIG. 10 is a drawing of an exemplary SPI command table in accordance with an exemplary embodiment.

DETAILED DESCRIPTION

To allow for a common SPI bus to be used with a large number of devices, an additional level of protocol is used which embeds a device address in the SPI data stream with different devices being assigned different addresses. The assigned device address is defined as the CHIP_ID, with different CHIP_IDs corresponding to different devices. The CHIP_ID can be, and sometimes is, embedded in the serial data stream to indicate which device the data stream is intended for at a given time.

A problem addressed by some features of the invention is how to assign a unique CHIP_ID to each device coupled to a common SPI bus, e.g., where each device may be, and sometimes is, a device in an array. A typical approach is to program the CHIP_ID via external pins which are tied to Vdd or Vss to set a unique binary value for each device on the board. To support vary large arrays many pins are required, for example, to support an array of 64 devices, 6 pins on the device would need to be dedicated to this purpose. The use of external pins for setting the CHIP_ID has some drawbacks. The physical pins take up area on the device pin grid and require IO cells be instantiated in the IC design which also increases the area of the chip. Additionally, the addressing of the devices is controlled by board design and the chip_id pins must be connected to power or ground with a different pattern for each instance of the device in the board design, creating more design overhead.

This application describes an alternate approach to assigning CHIP_IDs to the devices which avoids one or more of the problems listed above, e.g., the problem of requiring distinct lines. In various embodiments of the current invention the CHIP_ID values are assigned by the devices in response to an enumeration command. An enumeration daisy chain is defined which allows for a chip designer to select an arbitrary length CHIP_ID without increasing the IO demands on the chip interface. Additionally, the wiring of each of the devices in a board design is consistent except for the first device in the daisy chain. The enumeration function is initiated with a single SPI transaction and does not increase the software burden of initializing the array.

Figure 1:
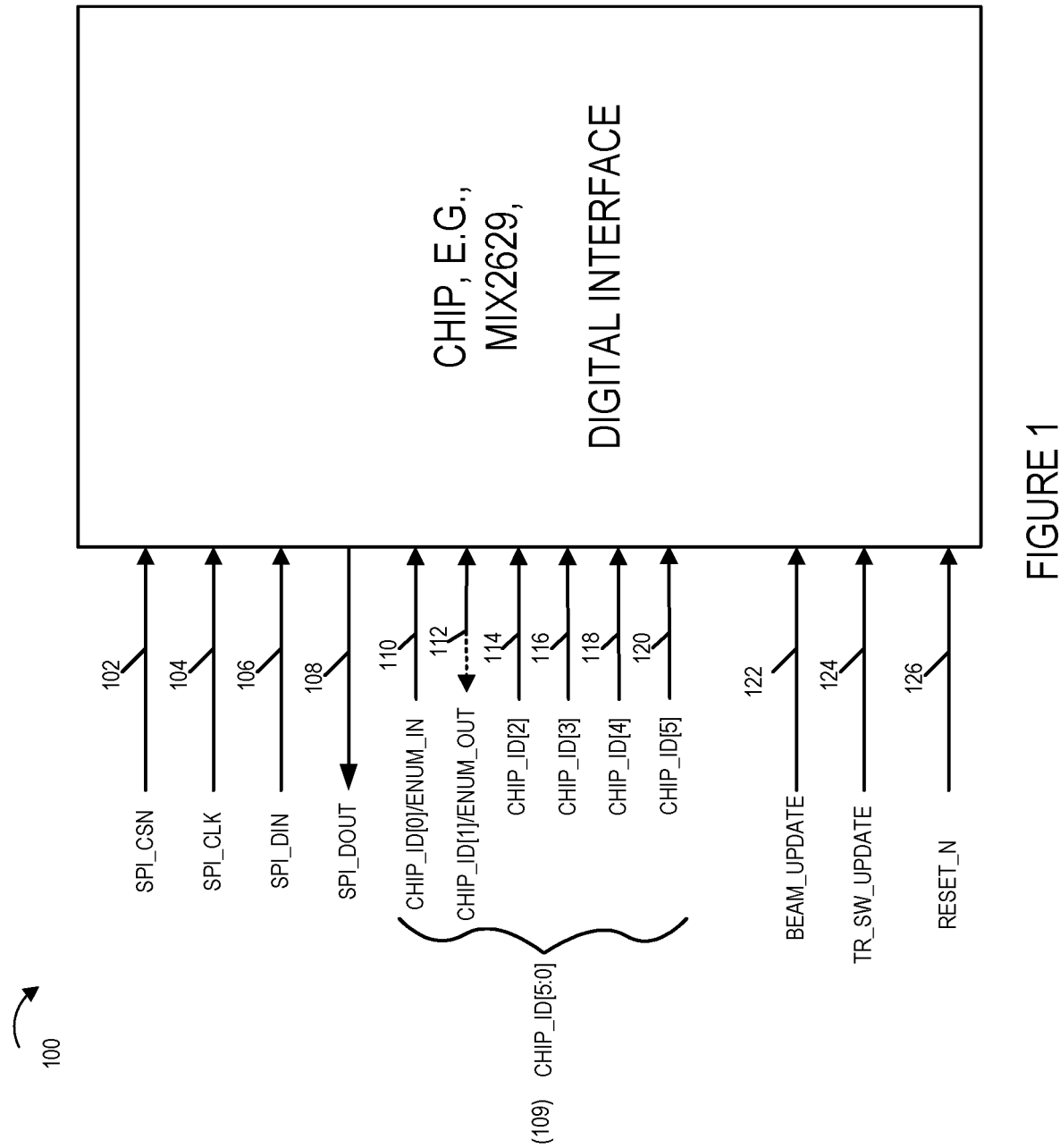
FIG. 1 is a drawing of the top level of an exemplary Serial Peripheral Interface (SPI) interface block in accordance with an exemplary embodiment.

FIG. 1 is a drawing of the top level of an exemplary digital interface 100, which is a Serial Peripheral Interface (SPI) interface block, e.g., a MIX 2629 interface block, in accordance with an exemplary embodiment. The exemplary digital interface 100 includes a SPI_CSN input pin 102, a SPI_CLK input pin 104, a SPI_DIN input pin 106, a SPI_DOUT output pin 108, a set 109 of 6 pins designated CHIP_ID[0:5] including i) CHIP_ID[0]/ENUM_IN input pin 110, ii) CHIP_ID[1]/ENUM_OUT (input/output) pin 112, iii) CHIP_ID[2] input pin 114, iv) CHIP_ID[3] input pin 116, v) CHIP_ID[4] input pin 118 and vi) CHIP_ID[5] input pin 120, BEAM_Update input pin 122, a TR_SW_UPDATE input pin 124, and a Reset_N input pin 126.

FIG. 2 is a drawing of a table 200 illustrating a digital interface, e.g. a MIX 2629 digital interface, pinout in accordance with an exemplary embodiment. First column 202 of table 200 lists each pin name. Second column 204 of table 200 lists the direction (in or out) corresponding to each pin name. Third column 206 lists the connection type (external pad or external tri-state) corresponding to each pin name. Fourth column 208 lists the function corresponding to each pin name. Row 210 indicates that the SPI_CSN pin 102 is an input pin with an external pad connection and it function as a SPI chip select, with active low. Row 212 indicates that SPI_CLK pin 104 is an input pin with an external pad connection and its function is to receive the SPI clock. Row 214 indicates that SPI_DIN (MOSI DATA) pin 106 is an input pin with an external pad connection and its function is to receive SPI data into slave from master. Row 216 indicates that SPI_DOUT (MOSI DATA) pin 108 is a tri-state output pin with an external pad connection and its function is to output SPI data out of slave to master. Row 218 indicates that RESET_N pin 116 is an input pin with an external pad connection and its function is to receive a block reset, with active low. Row 220 indicates that BEAM_UPDATE pin 112 is an input pin with an external pad connection and its function is to receive an update for the beam index latch. Row 222 indicates that TR_SW_UPDATE pin 114 is an input pin with an external pad connection and its function is to receive an update for the TR switch latch. Row 224 indicates that the set 109 of six pins designated CHIP_ID[5:0] are input pins with an external pad connection and its function is to receive a 6 bit chip ID. Row 226 indicates that the ENUM_IN pin 110 is input pin with an external pad connection and its function is to receive enumeration input; the ENUM_IN pin 110 is multiplexed with CHIP_ID[0] pin 110, which is one of the pins in set 109 of 6 pins. Row 228 indicates that the ENUM_OUT pin 112 an output pin with an external pad connection and its function is to perform enumeration output; the ENUM_OUT pin 112 is multiplexed with CHIP_ID[1] input pin 112, which is one of the pins in set 109 of 6 pins.

SPI Transactions and addressing will now be described. For example, the SPI communication defined below includes an atomic 32-bit or 56-bit transaction defined by the chip_select being active for 32 or 56 clock cycles. Within this atomic transaction, specific bits are reserved to indicate which device on the shared bus is the target for the transaction.

The transaction is initiated by the chip-select line going low, followed by 32 or 56 clock rising edges, and terminated by the chip-select line rising. The general structure for an exemplary SPI transaction is shown in drawing 300 of FIG. 3. Drawing 300 illustrates the chip select line (SPI_CSN 302) going low 303, followed by 32 or 56 clock rising edges (307, 307', . . . 307") of SPI_CLK 304. The SPI_DIN line 306 (for inputting SPI data into slave from master) is also shown.

The primary transaction uses a SHORT_ID (8-bits) to address a chip and is 32-bits long. There is also specialized command for programming the CHIP_ID that uses the device Unique ID for addressing and is 56-bit long. The contents of the SPI transaction are given in the Table 400 of FIG. 4 for the 32 bit transaction and in table 500 of FIG. 5 for the 56 bit transaction. Data is sent in least significant bit (LSB) first, i.e. bit 0, corresponds to the first clock of the transaction.

Table 400 of FIG. 4 describes the bits of a 32 bit transaction in accordance with an exemplary embodiment. First column 402 lists sets of bits; second column 404 lists the name corresponding to each set of bits; and third column 406 lists a description for each set of bits.

Bit 0 is a ID type indicator bit and a value of 1 indicates 8 bits chip ID addressing. Bits 1-8 are named CHIP ID[0:7] and are chip identifier bits programming by tying external pins high or low. Bits 9-15 are named COMMAND[0:6] and are described in the command table of FIG. 10. Bits 16-31 are named PAYLOAD[0:15] and convey a 16-bit data payload.

Table 500 of FIG. 5 describes the bits of a 56 bit transaction in accordance with an exemplary embodiment. First column 502 lists sets of bits; second column 504 lists the name corresponding to each set of bits; and third column 506 lists a description for each set of bits.

Bit 0 is an ID type indicator bit and a value of 0 indicates 32 bit unique ID addressing. Bits 1-32 are named CHIP ID[0:32] and communicate a chip identifier which is a 32-bit unique ID. Bits 33-39 are named COMMAND[0:6] and are described in the command table of FIG. 10. Bits 40-55 are named PAYLOAD[0:15] and convey a 16-bit data payload.

In this fashion, multiple devices can share the same clock, data, and chip_select lines and be individually addressed by their CHIP_ID. One CHIP_ID value is reserved for broadcast addressing. This value, "11111111", is recognized as a valid address by all devices independent of it's assigned ID.

CHIP_ID assignment will now be described. The assignment of CHIP_ID values to devices can be done at board design time by strapping the external chip_id pins of the digital interface to Vdd (1.8V logic "1") 620 or Vss (GND logic "0") 622. In the exemplary design, 6 of the 8 CHIP_ID values are brought to external pins allowing for up to 64 devices uniquely addressable. This method does not permit all 8 bits of the CHIP_ID to be uniquely assigned. In Drawing 600 FIG. 6 each device (602, 604, 606, 608) in an array 601 of devices is represented by a box with the assigned address (ADDR 0, ADDR 1, ADDR 2, ADDR 3), respectively indicated in the box. The device may be and sometimes is a chip including a processor, interface and memory which are coupled together by a bus. The interface includes the input/output lines shown in FIG. 6. The processor controls the device to act under control of one or more routines stored in memory. The memory can store the assigned address that is determined in the manner described herein.

Figure 6:
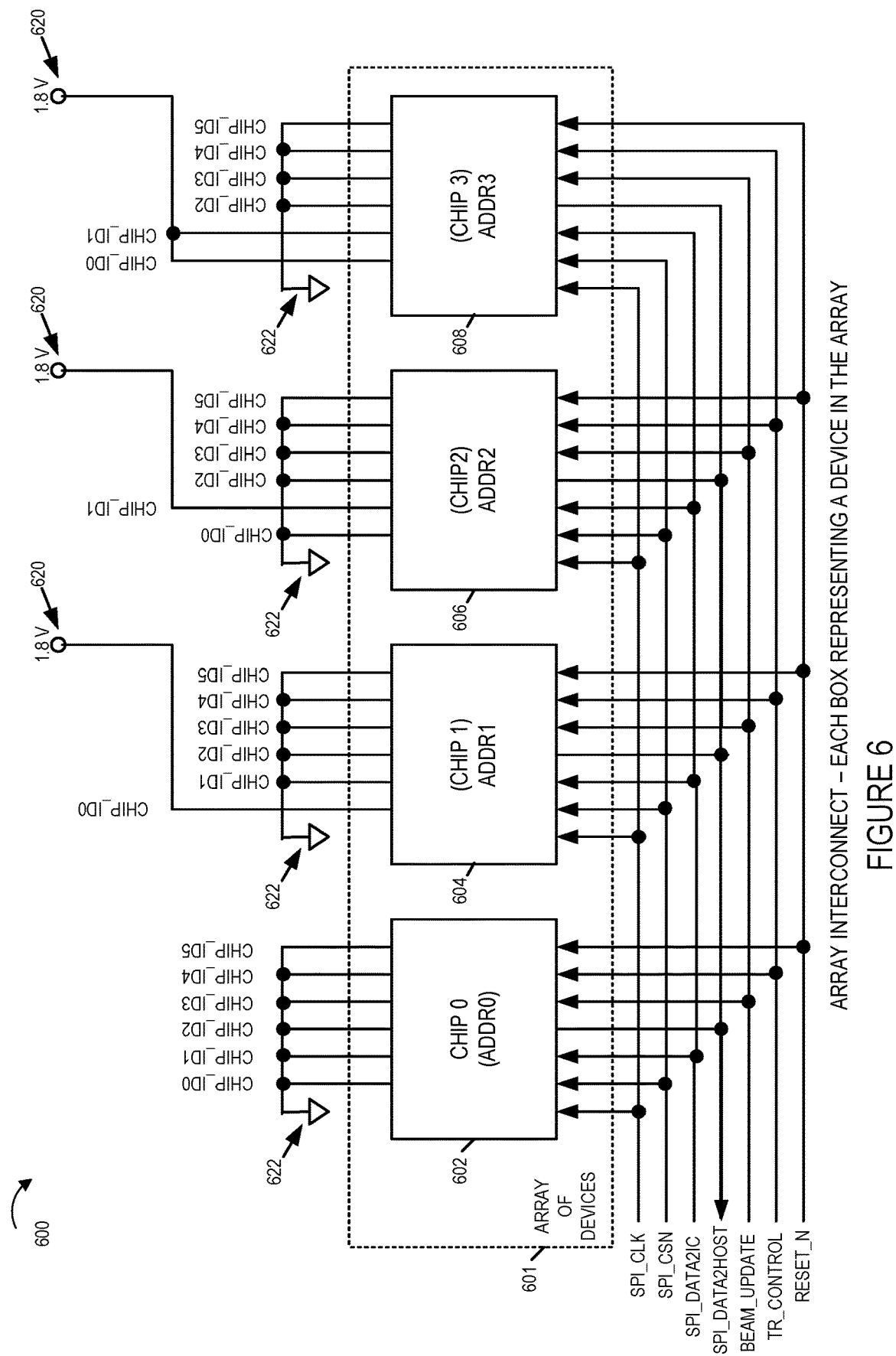
FIG. 6 is a drawing illustrating the programming of CHIP_ID by pin strapping.

Drawing 600 of FIG. 6 illustrates the programming of CHIP_ID by pin strapping.6. For CHIP 0 602, each of its CHIP_ID pins (CHIP_ID[0], CHIP_ID[1], CHIP_ID[2], CHIP_ID[3], CHIP_ID[4], CHIP_ID[5]) are strapped to VSS (GND logic "0") 622. For CHIP 1 604, CHIP_ID pins (CHIP_ID[1], CHIP_ID[2], CHIP[3], CHIP_ID[4], CHIP_ID[5]) are strapped to VSS (GND logic "0") 622, while CHIP_ID[0] pin is strapped to Vdd (1.8V logic "1") 620. For CHIP 2 606, CHIP_ID pins (CHIP_ID[0], CHIP_ID[2], CHIP[3], CHIP_ID[4], CHIP_ID[5]) are strapped to VSS (GND logic "0") 622, while CHIP_ID[1] pin is strapped to Vdd (1.8V logic "1") 620. For CHIP 3 608, CHIP_ID pins (CHIP_ID[2], CHIP[3], CHIP_ID[4], CHIP_ID[5]) are strapped to VSS (GND logic "0") 622, while CHIP_ID pins (CHIP_ID[0] and CHIP_ID[1]) are strapped to Vdd (1.8V logic "1") 620.

Figure 7:
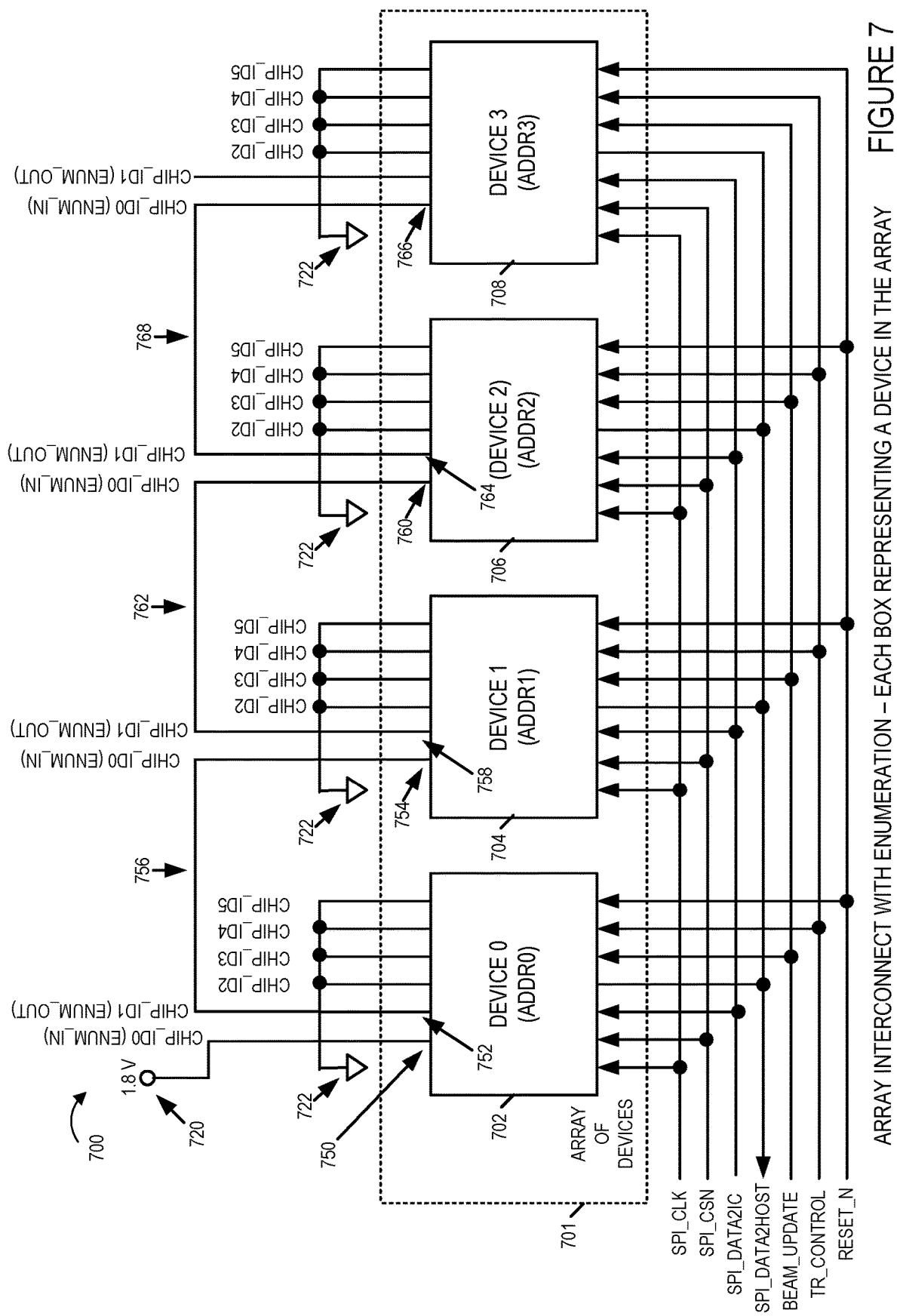
FIG. 7 illustrates an exemplary array interconnect with enumeration, in accordance with some embodiments.

An exemplary array design illustrating array interconnect with enumeration, in accordance with some embodiments, is shown in drawing 700 of FIG. 7. In various embodiments implemented in accordance with one features of the invention, for enumeration operation, e.g., the assignment of a number to a device, the enumeration operation uses two of the chip_id pins, which are repurposed for enumeration, and these pins are connected in a daisy chain through each of the devices (e.g., 702, 704, 706, 708) in the array, e.g., array 701. Chip_id[0] (see pin 110 of FIG. 1) is the enumeration input and chip_id[1] (see pin 112 of FIG. 1) is the enumeration output for an individual device within the array 701. The input 750 of the first device 702 can be, and in various embodiments is, tied to Vdd 720 and then the output 752 is tied to the input 754 of the next device 704, via connection 756. When the enumeration process is invoked the first device 702 is assigned address 0 and the next device 704 in the daisy chain is assigned address 1, etc. throughout the array 701. The remaining chip_id pins can be, and in various embodiments, are tied to Vss 722.

Thus, in the enumeration daisy chain example of FIG. 7, the input 750 of the device 0 702 is tied to Vdd 720, and the output 752 of device 0 702 is tied to the input 754 of the device 1 704, via connection 756; the output 758 of device 1 704 is tied to the input 760 of the device 2 706, via connection 762; the output 764 of device 2 706 is tied to the input 766 of the device 3 708, via connection 768; and CHIP_ID[2], CHIP_ID[3], CHIP_ID[4], and CHIP_ID[5] inputs of each of the devices (702, 704, 706, 708) are strapped to Vss (logic '0') 722.

In this manner, the entire 8-bit CHIP_ID space can be assigned and up to 255 devices can be connected in the daisy chain. FIG. 7 shows 4 devices (702, 704, 706, 708) in exemplary array 701 connected in the daisy chain, e.g., for simplicity of illustration. In various embodiments, an exemplary array can, and sometimes does, include more than 4 devices, e.g. up to 255 devices, connected in the daisy chain.

As in the FIG. 6 array 601 each device (device 0 702, device 1 704, device 2 706, device 3 708) in the array 701 shown in FIG. 7 is represented by a box with the assigned address (ADDR0, ADDR1, ADDR2, ADDR3), respectively indicated in the box. Each device (702, 704, 706, 708) may be, and sometimes is, a chip including a processor, interface and memory which are coupled together by a bus. The interface includes the input/output lines shown in FIG. 7. The processor controls the device to act under control of one or more routines stored in memory. The memory can store the assigned address that is determined in the manner described herein.

Another method for setting the CHIP_ID is to use a SPI command to write the 8-bit value. To accomplish this a special 56-bit SPI transaction is used. In this transaction, a 32-bit Unique ID is used to address the device. The Unique ID is programmed into the device during manufacturing test and stored in non-volatile storage on the device. This mechanism is intended as a back-up in the case of a device failure interrupting the daisy chain. After initial enumeration the Unique ID stored on the device can be read and associated with its CHIP_ID and is then available to rewrite the CHIP_ID if the enumeration process where to fail.

An exemplary enumeration process, in accordance with some embodiments of the present invention, will now be described. A sketch of the exemplary enumeration process is shown in drawing 800 of FIG. 8.

Initially the enumeration process is in ENUM_IDLE state 802. The enumeration process is initialized by sending a specific command, e.g., INIT_ENUM_COMMAND 804 to each of the devices on the SPI chain via a broadcast address. This puts the each of the devices into the enum_armed state 808, and E_CNT is set equal to 0. Once armed, when the next SPI transaction starts (signaled by a '0' on spi_csn) (in step 810), which is detected by the devices, operation proceeds to step 814 in which the devices will start counting spi_clk cycles, e.g. detecting rising edges of the SPI_CLK, and checking, e.g., in response to each detected rising edge, in step 818 if a "1" is present on the Enum_In_pin, until a '1' is determined to be applied to the enum_in pin. In step 818 if the ENUM_IN pin of the device does not indicate a 1 is applied (e.g., indicates a 0 is applied), operation proceeds from step 818 to step 820, in which the device increments its current count of E_CNT by one. Upon detecting a "1" on the ENUM_IN pin, the device will store the count and set the device's CHIP_ID to the count value. Thus, in step 818 if the ENUM_IN pin of the device indicates a 1 is applied, operation proceed to step 822 in which the E_CNT value is captured and stored, and then in step 824 the device will set the device CHIP_ID to the count value, which is the value of E_CNT. During the period of the transaction when the device is in an armed state it will output on enum_out the signal appearing on enum_in with 1 spi_clk delay, as indicated by block 816. Thus by daisy chaining the devices from enum_out to enum_in the '1' value at the fist device in the chain will propagate 1 device per clock and the CHIP_IDs will be set as incrementing counts from 0 for the first device in the chain to N−1 for the Nth device in the chain.

Figure 8:
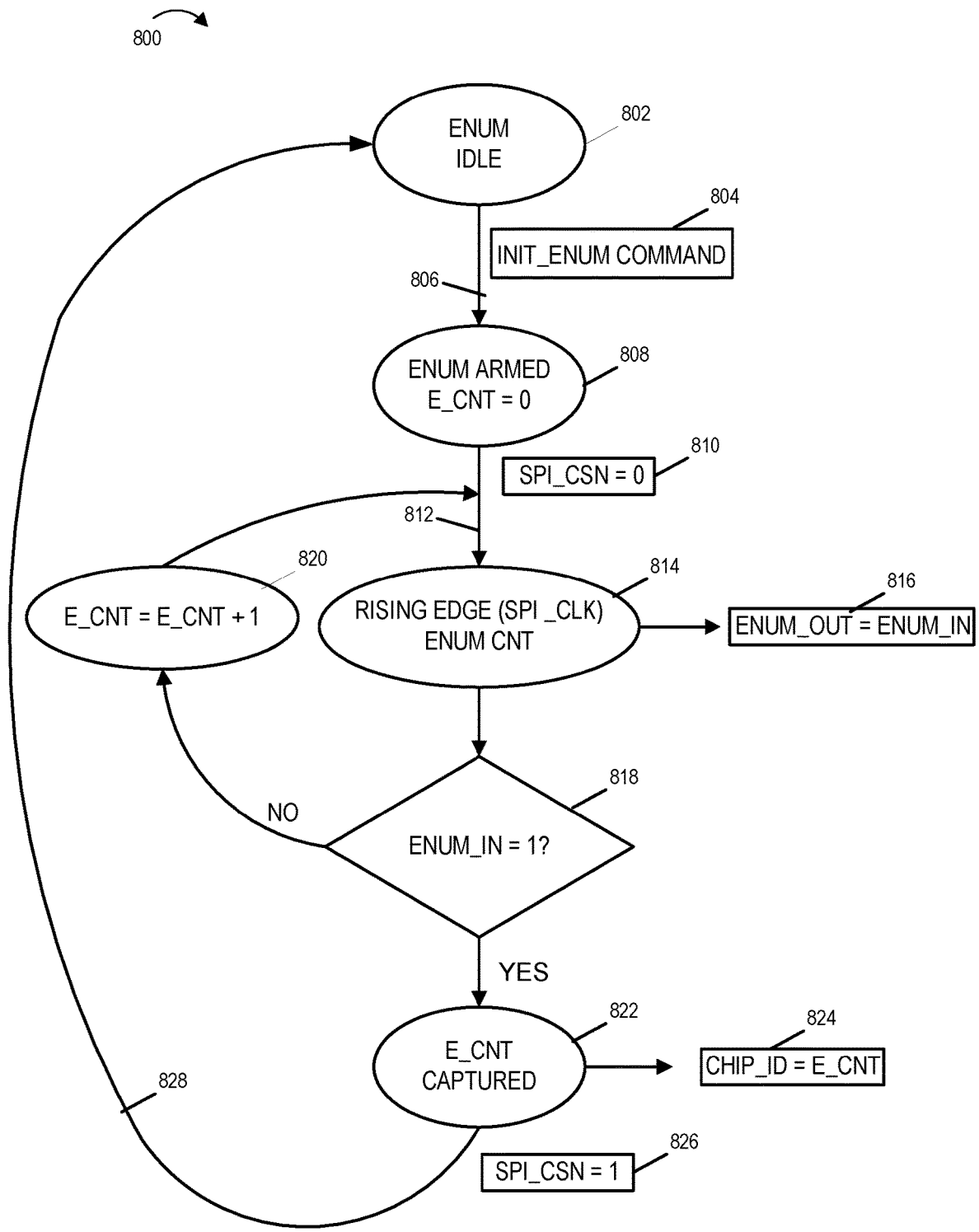
FIG. 8 is a sketch of an exemplary enumeration (ENUM) process in accordance with an exemplary embodiment.

FIG. 9 is a drawing 900 which illustrates waveforms during the ENUM process of FIG. 8 for a 4-daisy chain example. The waveforms shown in FIG. 9 include: i) SPI_ clock waveform 902, ii) SPI_CSN waveform 904, ENUM_IN device 0 waveform 906, which is constant at a "1" value, ENUM_OUT device 0/ENUM_IN device 1 waveform 908, ENUM_OUT device 1/ENUM_IN device 2 waveform 910, ENUM_OUT device 2/ENUM_IN device 3 waveform 912, and ENUM_OUT device 3.

In the example shown in FIGS. 8 and 9, for device 0, the final value for E_CNT is 0, and thus the CHIP_ID for chip 0 is set as 0. In the example shown in FIGS. 8 and 9, for device 1, the final value for E_CNT is 1, and thus the CHIP_ID for chip 0 is set as 1. In the example shown in FIGS. 8 and 9, for device 2, the final value for E_CNT is 2, and thus the CHIP_ID for chip 0 is set as 2. In the example shown in FIGS. 8 and 9, for device 1, the final value for E_CNT is 1, and thus the CHIP_ID for chip 3 is set as 3.

Exemplary SPI Commands, in accordance with some embodiments, will now be described. The example interface uses the 7 bit command word, part of the spi transaction, to determine how the payload data is used. The commands are summarized in the SPI command table 1000 of FIG. 10. First column 10002 lists commands; second column 1004 lists the value for each command; and third column 1006 lists the description for each command.

The INIT_ENUM command (command=0×09) (see row 1008 of table 1000) places the device into a state in which it will perform an enumeration operation on the next SPI_CSN transaction. The enumeration process is described in more detail below. The payload value is not used by this command.

The WRITE_SHORT_ID (command=0×10) (see row 1010 of table 1000) uses unique ID addressing (56 bit transaction) to overwrite the CHIP_ID value. The 8 LSBs of the payload are loaded into the device CHIP_ID at the completion of this command.

SPI Special functions with now be described. The SPI interface has additional control lines and internal control functions to implement special features of the interface.

reset_n (see input 126 of FIG. 1): is an active low reset signal which puts the SPI interface into a known state. The address pointer, T/R switch, and both beam index registers are all set to 0. The CNTL bits are initialized to a default state as are the bits of Beam Set 0. All other beam set bits are defaulted to 0. Reset will also initiate calibration reset and the SPI_CLK must be active after RESET_N is released to allow the calibration data to be read and the bits initialized.

beam_update (see input 122 of FIG. 1): this line will load the beam coefficient index into a latch which is used to select the Beam Set output to the analog circuits when it is pulsed high. This line controls a transparent latch so if it is held high then a write to a beam index register will take effect immediately. This line allows for precise control of the beam switching time. If this line is held high the beam former parameters will be updated when a beam index write is completed.

tr_sw_update (see input 124 of FIG. 1): this line will control whether the device is in RX mode (TR_UPDATE=0) or TX mode (TR_UPDATE=1). The transition between states is handled by a TR state machine driven by SPI_CLK thus SPI_CLK needs to be active for the transition to take place.

chip_id (see inputs 109 of FIG. 1): there are 6 external pins which are used to set the 6 LSBs of the SHORT ID for any device. Upon reset the device SHORT ID will be set based on these pins with the 2 MSBs set to 0. This ID can be overwritten by using the devices Unique ID with a WRITE-SHORT-ID command. Additionally, the device enumeration process can be used to change the SHORT-ID. A SPI transaction will only be executed if the 8 ID bits of the transaction match the SHORT ID setting.

BROADCAST ID: the SHORT ID of "11111111" is a broadcast id and all chips will respond to a transaction beginning with this value. This is intended to update the beam index or tr_switch register for all chips in an array without addressing them individually, but it also applies to other register writes. Reads are not supported from the broadcast ID to avoid drive conflict of multiple chips in a wired-or connection of SPI_DOUT.

Beam updating will now be described. The BEAM_UPDATE signal (see input 124 of FIG. 1) provides a mechanism for a synchronized update of the beam forming parameters of all quadrants and both polarizations. There are four beam index pointers: horizontal polarization TX, vertical polarization TX, horizontal polarization RX, and vertical polarization RX. Each pointer can be updated individually to index a line in the beam table storage. The update is done through a SPI transaction to write an index pointer register, then when the beam_update signal is pulsed, the indexes are used to update the beamforming parameters output to the analog circuits.

Note the latch updates for the beam_set are asynchronous to the SPI_CLK and SPI_CSN, but to ensure antenna pattern integrity the latches should only be pulsed when the SPI_CSN is high. Additionally, writing to a beam_table address which is selected by an active beam index pointer will immediately change the phase and attenuation for that quadrant at the end of the transaction. This is not recommended for normal operation as it takes multiple operations to update the parameters of all elements in an array and it can lead to an undesired transient beam pattern.

Figure 12:
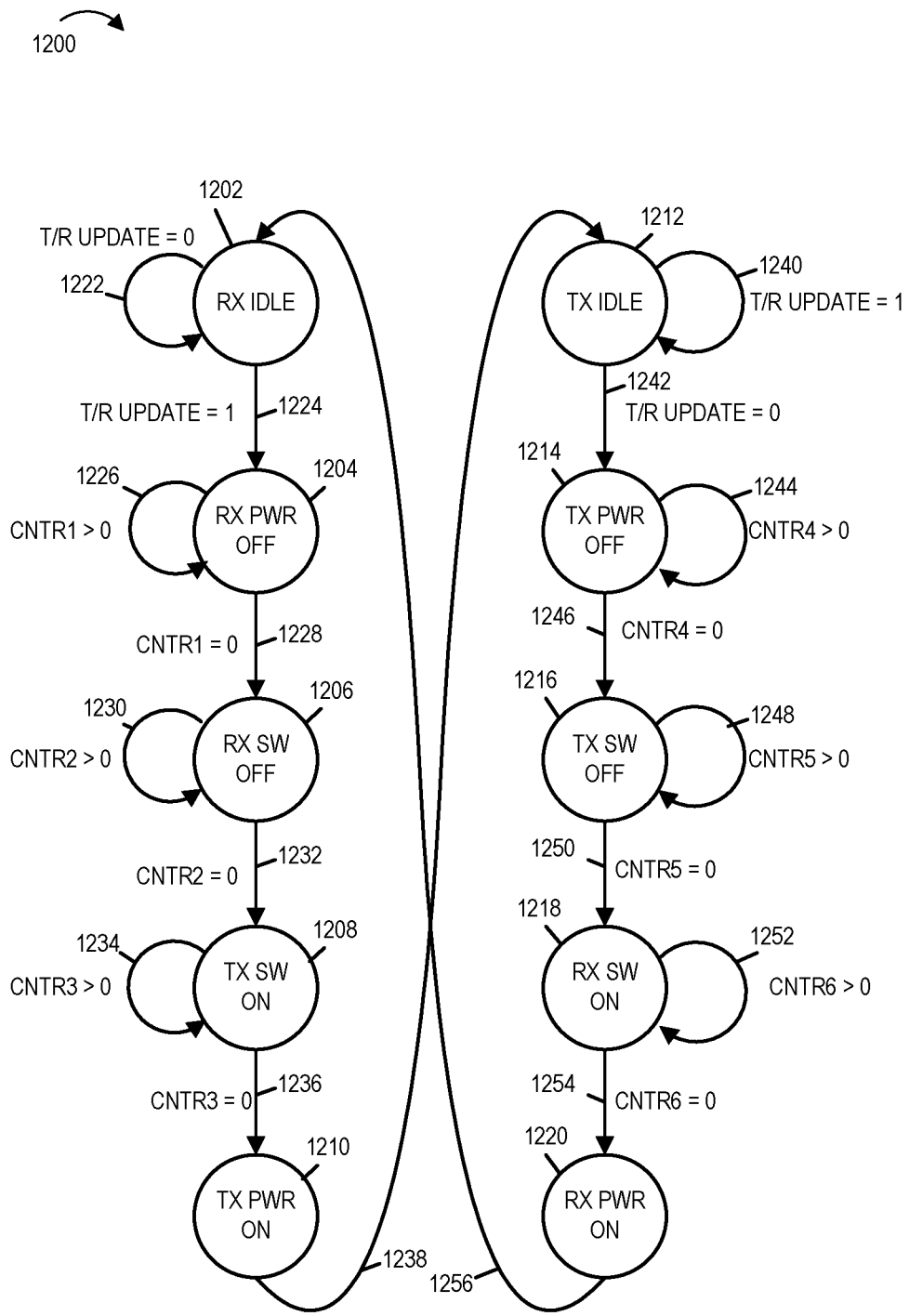
FIG. 12 is a drawing of an exemplary TR state machine in accordance with an exemplary embodiment.

FIG. 12 is a drawing of an exemplary TR state machine 1200 in accordance with an exemplary embodiment. T/R state Machine will now be described. SPI interface block contains a state machine for managing switching between RX and TX state. This state machine has several configurable registers to fine tune the control or override it for pure programmable control. The state machine uses the spi_clk to operate so this clock must be active following the tr_sw_update transition for enough cycles to complete the state transitions to the next IDLE state. The state of the machine can be read from the SPI interface to insure it is an IDLE state before disabling the clock.

The state machine will be reset to the RX_IDLE state 1202 by the RESET_N_line, this is the expected power on state. From an IDLE state if the tr_sw_update has transitioned when a SPI_CLK rising edge occurs the state machine will begin its transition. The machine will cycle through updating the power and switch states for the RX and TX elements and then return to an IDLE state. The state transitions occur based on programmable counters to fine tune the transition times. The state machine specification is given in drawing 1200 of FIG. 12.

From RX idle state 1202, if T/R update=0, then the state machine remains in RX idle state 1202, as indicated by arrow 1222. From RX idle state 1202, if T/R update=1, then the state machine transitions to RX power off state 1204, as indicated by arrow 1224, and initializes CNTR1 from the TR state machine counter 1100.

From RX power off state 1204, if CNTR1>0, then the state machine remains in RX power off state 1204, as indicated by arrow 1226, and decrements CNTR1. From RX power off state 1204, if CNTR1=0, then the state machine transitions to RX SW off state 1206, as indicated by arrow 1228, and initializes CNTR2 from the TR state machine counter 1100.

From RX SW off state 1206, if CNTR2>0, then the state machine remains in RX SW off state 1206, as indicated by arrow 1230, and decrements CNTR2. From RX SW off state 1206, if CNTR2=0, then the state machine transitions to TX SW on state 1208, as indicated by arrow 1232, and initializes CNTR3 from the TR state machine counter 1100.

From TX SW on state 1208, if CNTR3>0, then the state machine remains in TX SW on state 1208, as indicated by arrow 1234, and decrements CNTR3. From TX SW on state 1208, if CNTR3=0, then the state machine transitions to TX power on state 1210, as indicated by arrow 1236.

From the TX power on state 1210, the state machine transitions to TX idle state 1212, as indicated by arrow 1238.

From TX idle state 1212, if T/R update=1, then the state machine remains in TX idle state 1212, as indicated by arrow 1240. From TX idle state 1212, if T/R update=0, then the state machine transitions to TX power off state 1214, as indicated by arrow 1242, and initializes CNTR4 from the TR state machine counter 1100.

From TX power off state 1214, if CNTR4>0, then the state machine remains in TX power off state 1214, as indicated by arrow 1244, and decrements CNTR4. From TX power off state 1214, if CNTR4=0, then the state machine transitions to TX SW off state 1236, as indicated by arrow 1246, and initializes CNTR5 from the TR state machine counter 1100.

From TX SW off state 1216, if CNTR5>0, then the state machine remains in TX SW off state 1216, as indicated by arrow 1248, and decrements CNTR5. From TX SW off state 1216, if CNTR5=0, then the state machine transitions to RX SW on state 1218, as indicated by arrow 1250, and initializes CNTR6 from the TR state machine counter 1100.

From RX switch on state 1218, if CNTR6>0, then the state machine remains in RX switch on state 1218, and decrements CNTR6. as indicated by arrow 1252. From RX switch on state 1218, if CNTR6=0, then the state machine transitions to RX power on state 1220, as indicated by arrow 1254.

From the RX power on state 1220, the state machine transitions to RX idle state 1202, as indicated by arrow 1256.

Figure 11:
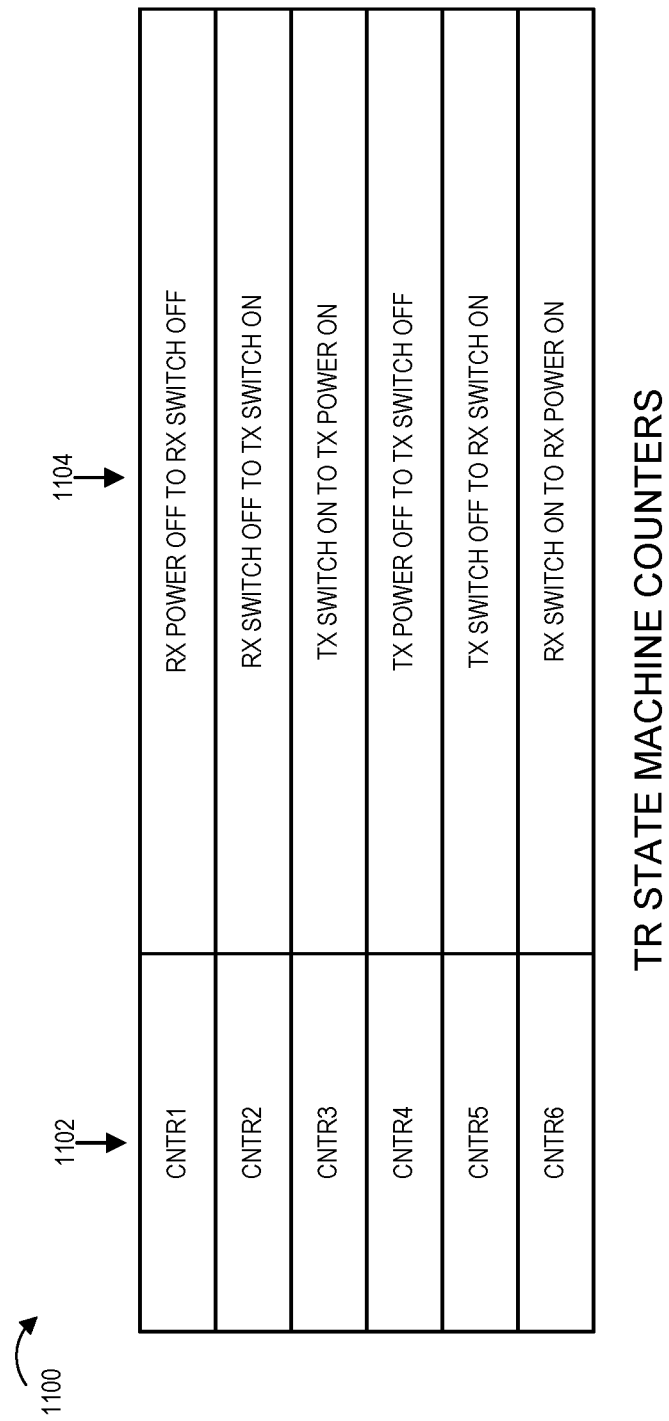
FIG. 11 is a drawing of a table of exemplary Transmit Receive (TR) state machine counters in accordance with an exemplary embodiment.

Table 1100 of FIG. 11 defines the TR state machine counters in first column 1102, and which transitions they control in second column 1104. The values for CNTR1 to CNTR6 are 5-bit values which can be programmed through the TR_Switch control registers and control the state transitions times. The minimum time is 1 SPI_CLK (10 ns) for a counter value of 0 and 32 SPI_CLK (320 ns) for a counter value of b'11111'.

Figure 13:
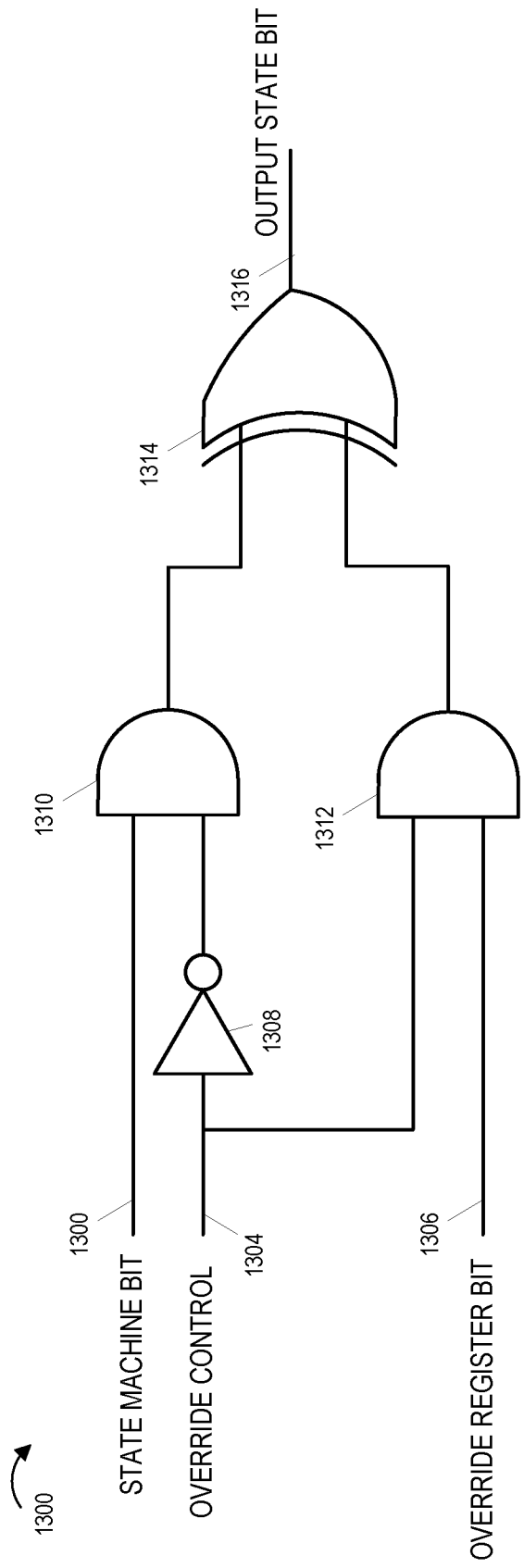
FIG. 13 is a drawing of an exemplary TR override logic circuit in accordance with an exemplary embodiment.

There are also override bits which can be used to force the TR control bits to a specific state. If the override bit is set for either the horizontal or vertical polarization state then the values of RX_PWR, RX_SW, TX_PWR, and TX_SW are taken from the override register for that particular polarization output. An exemplary logical diagram for the override control is shown in drawing 1300 of FIG. 13. The TR override logic circuitry of drawing 1300 includes two AND gates 1310, 1312, a NOT gate 1308, and an Exclusive OR (XOR) gate 1314 coupled together as shown in FIG. 13. Inputs to the TR override logic circuitry include a state machine bit input 1300, an override control input 1304, and an override register bit input 1306. The output of the TR override circuit in an output state bit 1316, which is output from the exclusive OR gate 1314.

The state machine uses the SPI_CLK to manage state transitions so the SPI_CLK must be active for the machine to complete. The number of SPI clocks depends on the CNTR values programmed. For a RX to TX switch it will require CNTR1+CNTR2+CNTR3+5 clock cycles (minimum 5 or 50 ns, maximum 98 or 980 ns). For a TX to RX switch it will require CNTR4+CNT5+CNT6+5 clock cycles.

Figure 14A:
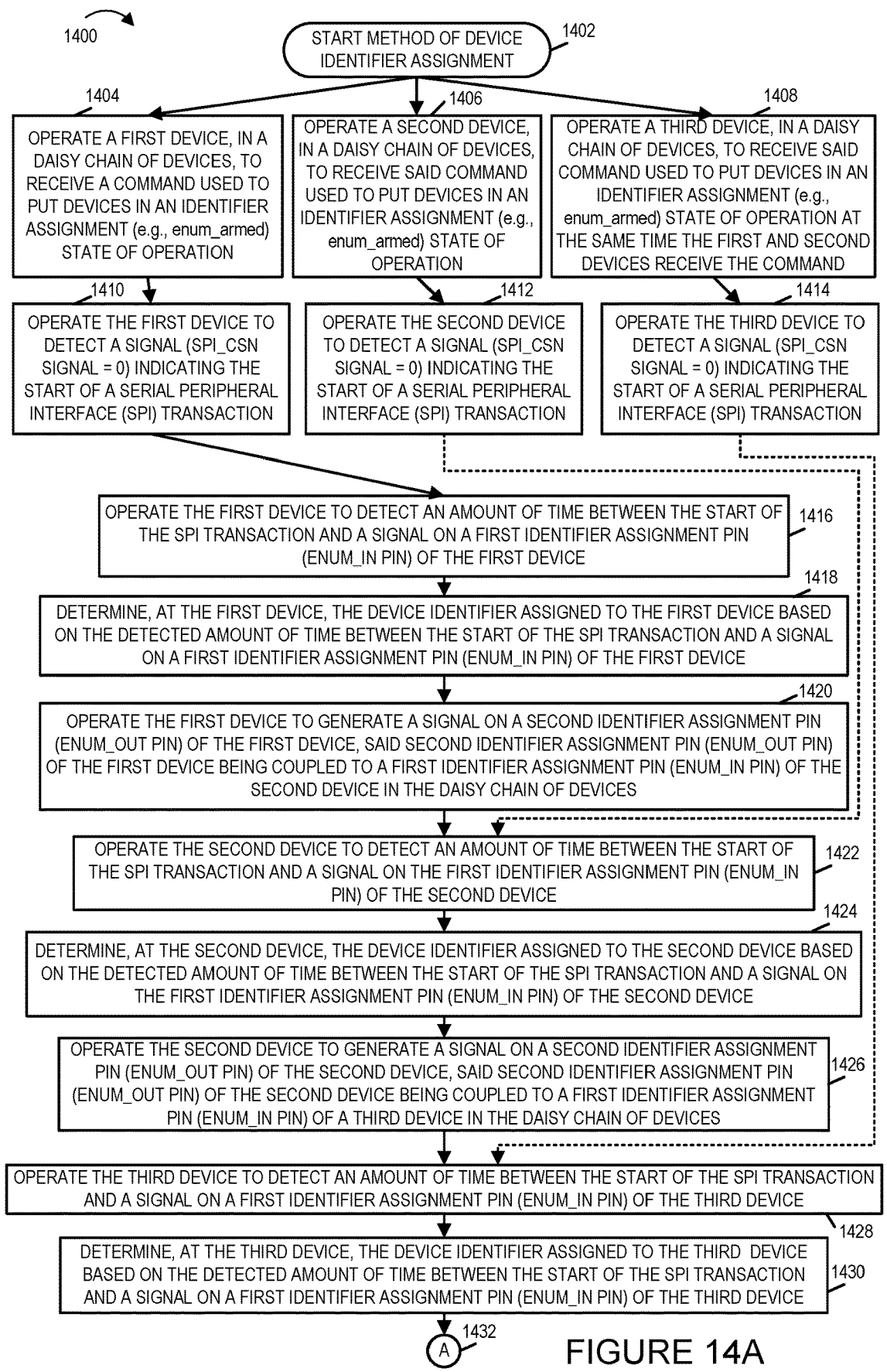
FIG. 14A is a first part of a flowchart of an exemplary method of device identifier assignment in accordance with an exemplary embodiment.
Figures 14, 14A, 14B:
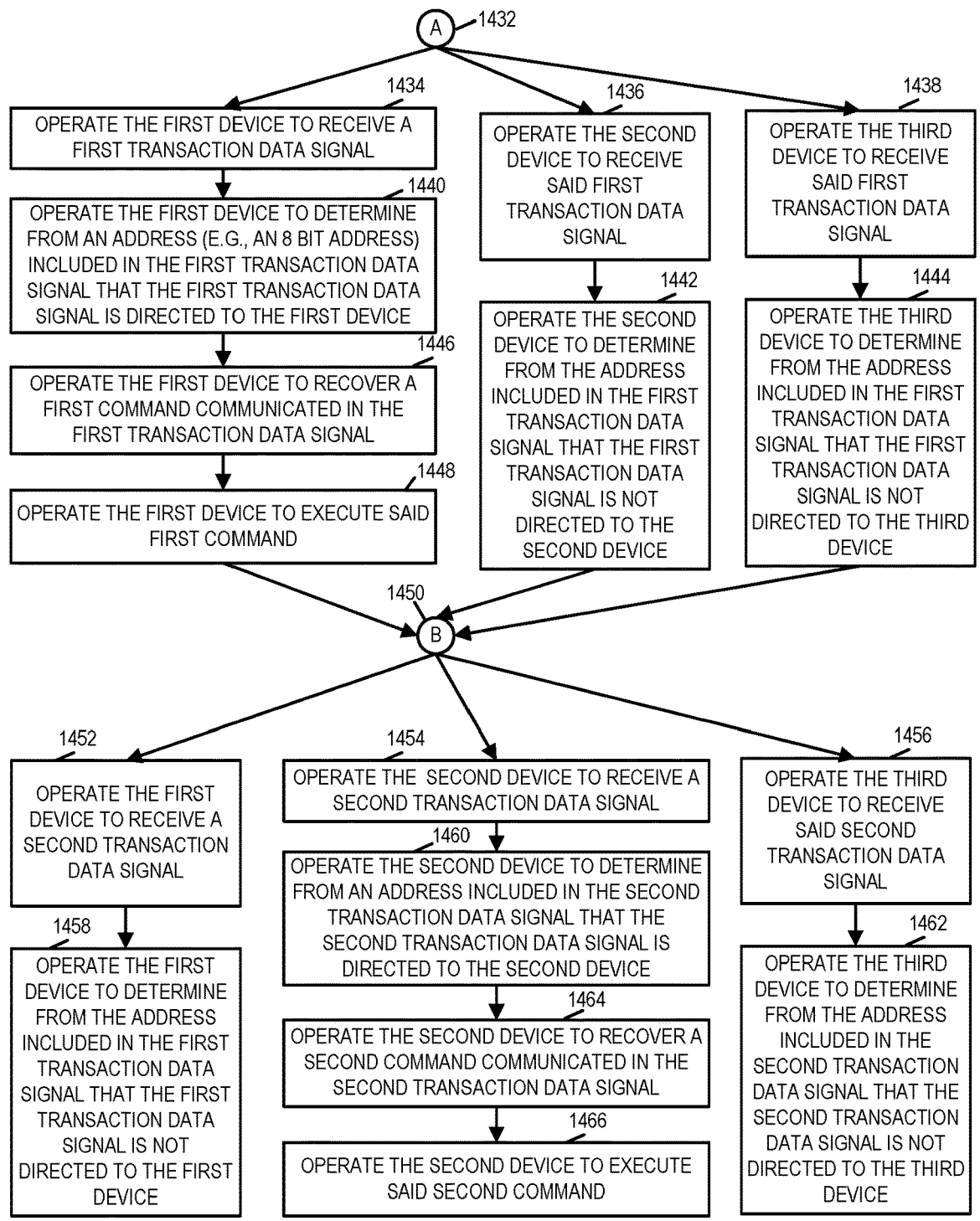
FIG. 14B is a second part of a flowchart of an exemplary method of device identifier assignment in accordance with an exemplary embodiment.
FIG. 14 comprises the combination of FIG. 14A and FIG. 14B.

FIG. 14, comprising the combination of FIG. 14A and FIG. 14B is a flowchart 1400 of an exemplary method of device identifier assignment in accordance with an exemplary embodiment. Operation of the exemplary method starts in step 1402, in which devices, e.g. including a first device, a second device and a third device, in a daisy chain of devices, in an array of devices, are powered on and initialized. Operation proceeds from step 1402 to steps 1404, 1406 and 1408 which may be performed in parallel.

In step 1404, the first device, in the daisy chain of devices, receives a command (e.g., init_enum command) to put devices in an identifier assignment (e.g. enum_armed) state of operation. In various embodiments, the command used to put devices in an identifier assignment state (e.g., enum_armed) state of operation is communicated in a broadcast signal, (e.g., with address=11111111). In step 1406, the second device, in the daisy chain of devices, receives the command (e.g., init_enum command) to put devices in an identifier assignment (e.g. enum_armed) state of operation. In step 1408, the third device, in the daisy chain of devices, receives the command (e.g., init_enum command) to put devices in an identifier assignment (e.g. enum_armed) state of operation at the same time the first and second devices receive the command.

Operation proceeds from step 1404 to step 1410, in which the first device detects a signal (spi_csn signal=0) indicating the start of a serial peripheral interface (SPI) transaction. In various embodiments, said first device is in said identifier assignment state of operation when said signal (spi_csn signal=0) indicating the start of a serial peripheral interface (SPI) transaction is received.

Operation proceeds from step 1406 to step 1412, in which the second device detects a signal (spi_csn signal=0) indicating the start of a serial peripheral interface (SPI) transaction. In various embodiments, said second device is in said identifier assignment state of operation when said signal (spi_csn signal=0) indicating the start of a serial peripheral interface (SPI) transaction is received.

Operation proceeds from step 1408 to step 1414, in which the third device detects a signal (spi_csn signal=0) indicating the start of a serial peripheral interface (SPI) transaction. In various embodiments, said third device is in said identifier assignment state of operation when said signal (spi_csn signal=0) indicating the start of a serial peripheral interface (SPI) transaction is received.

Operation proceeds from step 1410 to step 1416, in which the first device detects an amount of time between the start of the SPI transaction and a signal on a first identifier assignment pin (enum_in pin) of the first device. Operation proceeds from step 1416 to step 1418. In step 1418 the first device determines the device identifier assigned to the first device based on the detected amount of time between the start of the SPI transaction and a signal on the first identifier assignment pin (enum_in pin) of the first device. Operation proceeds from step 1418 to step 1420. In step 1420 the first device generates a signal on a second identifier assignment pin (enum_out pin) of the first device, said second identifier assignment pint (enum_out pin) of the first device being coupled to a first identifier assignment pin (enum_in pin) of the second device in the daisy chain of devices.

Operation proceeds from step 1412 and step 1420 to step 1422. In step 1422 the second device detects an amount of time between the start of the SPI transaction and a signal on a first identifier assignment pin (enum_in pin) of the second device. Operation proceeds from step 1422 to step 1424. In step 1424 the second device determines the device identifier assigned to the second device based on the detected amount of time between the start of the SPI transaction and a signal on the first identifier assignment pin (enum_in pin) of the second device. Operation proceeds from step 1424 to step 1426. In step 1426 the second device generates a signal on a second identifier assignment pin (enum_out pin) of the second device, said second identifier assignment pint (enum_out pin) of the second device being coupled to a first identifier assignment pin (enum_in pin) of the device in the daisy chain of devices.

Operation proceeds from step 1414 and step 1426 to step 1428. In step 1428 the third device detects an amount of time between the start of the SPI transaction and a signal on a first identifier assignment pin (enum_in pin) of the third device. Operation proceeds from step 1428 to step 1430. In step 1430 the third device determines the device identifier assigned to the third device based on the detected amount of time between the start of the SPI transaction and a signal on the first identifier assignment pin (enum_in pin) of the third device. Operation proceeds from step 1430, via connecting node A 1432, to steps 1434, 1436 and 1438, which may be performed in parallel.

In step 1434 the first device receives a first transaction data signal. In step 1436 the second device receives the first transaction data signal. In step 1438 the third device receives the first transaction data signal.

Operation proceeds from step 1434 to step 1440, in which the first device determines from an address (e.g., an 8 bit address) included in the first transaction data signal that the first transaction data signal is directed to the first device, e.g. the 8 bit address in the received first transaction signal matches the determined device identifier assigned to the first device obtained in step 1424. Operation proceeds from step 1440 to step 1446 in which the first device recovers a first command communicated in the first transactional data signal. Operation proceeds from step 1446 to step 1448 in which the first device executes the first command.

Operation proceeds from step 1436 to step 1442, in which the second device determines from the address (e.g., an 8 bit address) included in the first transaction data signal that the first transaction data signal is not directed to the second device, e.g. the 8 bit address in the received first transaction signal does not match the determined device identifier assigned to the second device, which was determined in step 1424.

Operation proceeds from step 1438 to step 1444, in which the third device determines from the address (e.g., an 8 bit address) included in the first transaction data signal that the first transaction data signal is not directed to the third device, e.g. the 8 bit address in the received first transaction signal does not match the determined device identifier assigned to the third device, which was determined in step 1430.

Operation proceeds from step 1448, 1442 and 1444 via connecting node B 1450 to step 1452, 1454 and 1456.

In step 1452 the first device receives a second transaction data signal. In step 1454 the second device receives the second transaction data signal. In step 1456 the third device receives the second transaction data signal.

Operation proceeds from step 1452 to step 1458, in which the first device determines from the address (e.g., an 8 bit address) included in the second transaction data signal that the second transaction data signal is not directed to the first device, e.g. the 8 bit address in the received first transaction signal does not match the determined device identifier assigned to the first device, which was determined in step 1418.

Operation proceeds from step 1454 to step 1460, in which the second device determines from an address (e.g., an 8 bit address) included in the second transaction data signal that the second transaction data signal is directed to the second device, e.g. the 8 bit address in the received second transaction signal matches the determined device identifier assigned to the second device obtained in step 1418. Operation proceeds from step 1460 to step 1464 in which the second device recovers a second command communicated in the second transactional data signal. Operation proceeds from step 1464 to step 1466 in which the second device executes the second command.

Operation proceeds from step 1456 to step 1462, in which the third device determines from the address (e.g., an 8 bit address) included in the second transaction data signal that the second transaction data signal is not directed to the third device, e.g. the 8 bit address in the received second transaction signal does not match the determined device identifier assigned to the third device, which was determined in step 1430.

In some embodiments, said device identifier assigned to the second device is one number higher than said device identifier assigned to the first device. In some such embodiments, said device identifier assigned to the third device is one number higher than said device identifier assigned to the second device.

In some embodiments, said first and second pins of the first device are CHIP_ID pins of a serial peripheral interface; and said signal (spi_csn signal=0) indicating the start of a serial peripheral interface (SPI) transaction is a SPI_CSN signal communicated on an SPI_CSN pin of a SPI interface; and said command (init_enum) used to put devices in an identifier assignment state is communicated in broadcast signal In one exemplary embodiment, the first device is device 702, the second device is device 704 and the third device is device 706 of array 701 of FIG. 7. In another exemplary embodiment, the first device is device 704, the second device is device 706 and the third device is device 708 of array 702 of FIG. 7.

Figure 15:
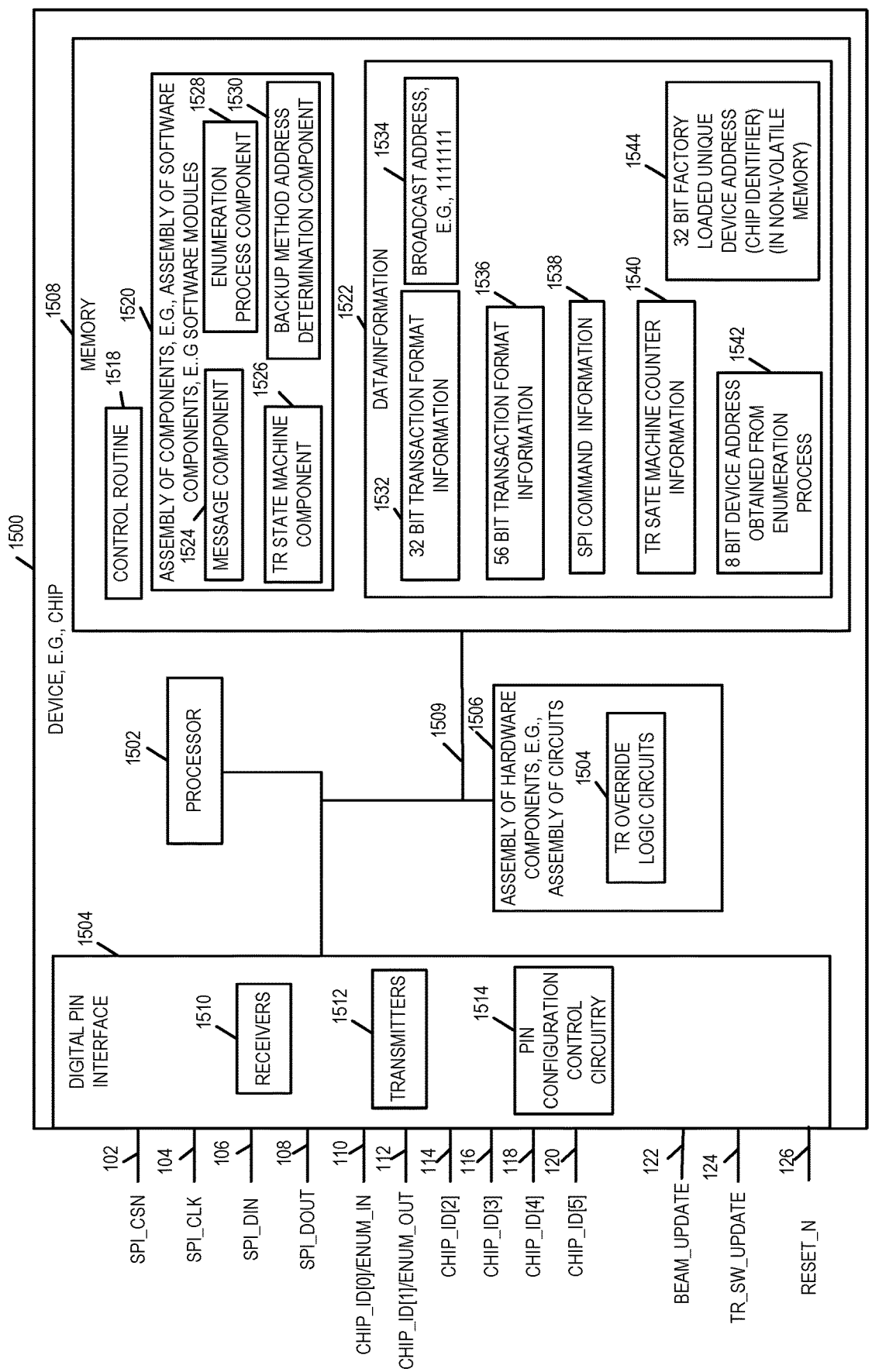
FIG. 15 is a drawing of an exemplary device, e.g., a chip, implemented in accordance with an exemplary embodiment.

FIG. 15 is a drawing of an exemplary device 1500, e.g., a chip, implemented in accordance with an exemplary embodiment. Exemplary device 1500 is, e.g. any of the devices (702, 704, 706, 708) of array 701 of FIG. 7 and/or a device implementing steps of the method of FIG. 14. Device 1500, e.g., a chip, includes a processor 1502, e.g., a CPU, a digital pin interface 1504, an assembly of hardware components 1506, e.g., assembly of circuits, and memory 1508 coupled together via a bus 1509 over which the various elements may interchange data and information. Digital pin interface 1504 includes the following pins: SPI_CSN pin 102, SPI_CLK pin 104, SPI_DIN pin 106, SPI_DOUT pine 108, CHIP_ID[0]/ENUM_IN pin 110, CHIP_ID[1]/ENUM_OUT pin 112, CHIP_ID[2] pin 114, CHIP_ID[3] pin 116, CHIP_ID[4] pin 118, CHIP_ID[5] pin 120, BEAM_UPDATE pin 122, TR_SW_UPDATE pin 124, and RESET_N pin 124. Digital pin interface 1504 further includes receivers 1510 for receiving signals from pins being used as inputs, transmitters 1512 for transmitting signals for pins being used as outputs, and pin configuration control circuitry, e.g., for facilitating CHIP_ID[1]/ENUM_OUT pin 112 to be used as an input pin during some times and to be used as an output pin during other times.

Assembly of hardware components 1506 includes TR override circuits, e.g. each TR override circuit in accordance with exemplary TR override circuit 1300 of FIG. 13.

Memory 1508, which includes non-volatile and volatile memory, includes a control routine 1518, assembly of components 1520, e.g., an assembly of software components, e.g., software modules, and data/information 1522. Assembly of software components 1520 includes a message component 1524, a TR state machine component 1526, an enumeration process component 1528 and a backup method address determination component 1530. Message component 1524 receives messages, extracts information from received messages and generates messages to be transmitted. TR state component 1526 performs operation to implement a state machine, e.g., in accordance with exemplary TR state machine of FIG. 12. Enumeration process component 1526 performs operation for implementing an enumeration process for chip address assignment. Backup method address determination component 1530 performs operations for chip address determination in the event of a failure with regard to the enumeration method, e.g. using a 56 bit transaction and using a 32 bit factory loaded address stored in non-volatile memory of device 1500. Data/information 1522 includes 32 bit transaction format information 1532, e.g., table 400 of FIG. 4, 56 bit transaction format information 1536, e.g., table 500 of FIG. 5, SPI command information 1538, e.g., SPI command table 1000 of FIG. 10, TR state machine counter information 1540, e.g., information of table 1100 of FIG. 11, an 8 bit device address (for device 1500 within an array of devices), obtained from the enumeration process, and a 32 bit factory loaded unique device address (chip identifier) which is stored in non-volatile memory within memory 1508.

Figure 16:
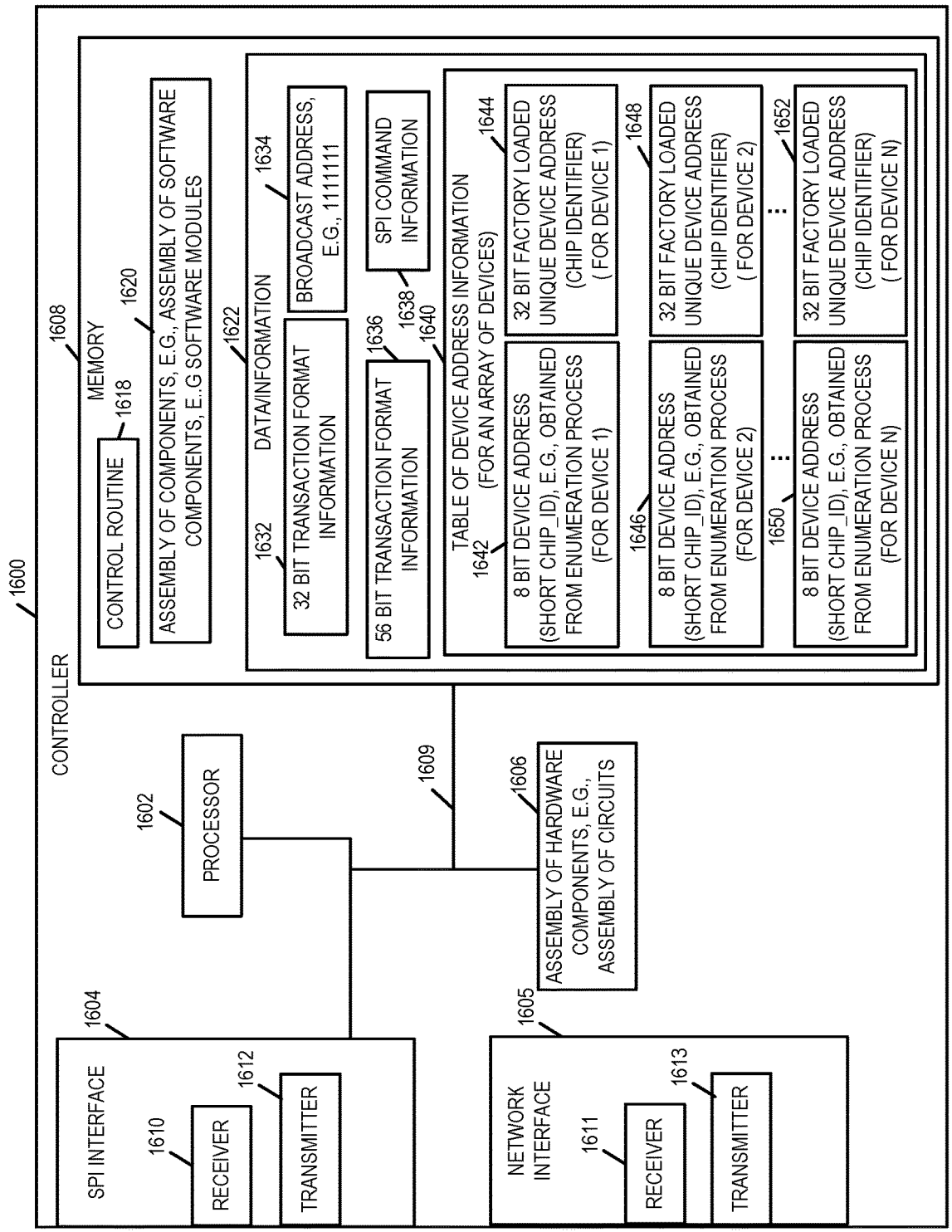
FIG. 16 is a drawing of an exemplary controller in accordance with an exemplary embodiment.

FIG. 16 is a drawing of an exemplary controller 1600 in accordance with an exemplary embodiment. Exemplary controller 1600 includes a processor 1602, e.g., a CPU, a SPI interface 1604 including a receiver 1610 and a transmitter 1612, a network interface 1605 including a receiver 1611 and a transmitter 1613, an assembly of hardware components 1606, e.g., an assembly of circuits, and memory 1608 coupled together via a bus 1609 over which the various elements may interchange data and information. SPI interface 1604 is, e.g., coupled to an array of devices, e.g., array 601 of FIG. 6. Exemplary pins on SPI interface 1604, include e.g., SPI_CLK pin, SPI_CSN pin, SPI_DATA2IC pin, SPI_DATA2HOST pin, BEAM_UPDATE pin, TR_CONTROL pin, and RESET_N pin. The SPI interface may and sometimes does include the same set of connections, e.g., PINS 102 through 126, as the digital pin interface 1504 shown in FIG. 15. In fact, digital pin interface 1504 may be and sometimes is used as the SPI interface 1600 but with the controller using the pins to send control signals to the digital PIN interfaces as part of controlling the devices to perform enumeration operations, write and read operations, etc. and for receiving data and signals from the chips in an array in accordance with the invention. In accordance with the invention. Network interface 1605 couples the controller to other devices in a communications system, e.g., with the pins of the controller corresponding to the signal lines shown in FIG. 7 coupling the SPI interface 1604 to the devices, e.g., integrated circuit chips, in the array 700 in at least some embodiments.

Memory 1608 includes a control routine 1618, an assembly of components 1620, e.g., an assembly of software components, e.g., software modules, and data/information 1622. The data/information 1622 includes 32 bit transaction format information 1632, a broadcast address 1634, e.g., 11111111, 56 bit transaction format information 1636, SPI command information 1638, and a table of device address information (for an array of devices, e.g., array of chips) 1640. Table of device information 1640 includes: i) an 8 bit device address, sometimes referred to as short CHIP_ID, and ii) a 32 bit factory loaded unique device address, for each device in the array of devices ((8 bit device address (short CHIP_ID), e.g., obtained from enumeration process, for device 1 1642, 32 bit factory loaded unique address (chip identifier) for device 1 1644), (8 bit device address (short CHIP_ID), e.g., obtained from enumeration process, for device 2 1646, 32 bit factory loaded unique address (chip identifier) for device 2 1648), . . . , (8 bit device address (short CHIP_ID), e.g., obtained from enumeration process, for device n 1650, 32 bit factory loaded unique address (chip identifier) for device n 1652)). In some embodiments, a 32 factory loaded unique device address for a device in the array is obtained via a read operation of the device, e.g., using the short chip_ID address following a successful enumeration process in which a short chip_ID was assigned to the device, and the obtained 32 bit address is stored in memory 1608 and associated with the short chip_ID address. In some embodiments, a 32 factory loaded unique device address for a device in the array is obtained from manufacturing records or through operator input, and the obtained 32 bit address is stored in memory 1608 and associated with the short chip_ID address for the device. In some embodiments, a subsequent enumeration process may fail, and the stored information in table 1640 is used to install, e.g., write, the correct short chip_IDs in one or more devices in the array. In some embodiments, a 32 bit address may be, and sometimes is, used to address a chip for which the enumeration process has failed, and is used to write, e.g., overwrite a stored 8 bit short chip_ID stored on the chip, e.g., in a register or other volatile memory.

NUMBERED LIST OF EXEMPLARY METHOD EMBODIMENTS

Method Embodiment 1 A method of device identifier assignment, the method comprising: detecting (1410), at a first device in a daisy chain of devices, a signal (spi_csn signal=0) indicating the start of a serial peripheral interface (SPI) transaction; operating (1416) the first device to detect an amount of time between the start of the SPI transaction and a signal on a first identifier assignment pin (enum_in pin) of the first device; and determining (1418), at the first device, the device identifier assigned to the first device based on the detected amount of time between the start of the SPI transaction and a signal on a first identifier assignment pin (enum_in pin) of the first device.

Method Embodiment 2 The method of Method Embodiment 1, further comprising, prior to detecting (1410) said signal (spi_csn signal=0) indicating the start of a serial peripheral interface (SPI) transaction, operating (1404) the first device in the daisy chain of devices to receive a command used to put devices in an identifier assignment state (e.g., enum armed state) of operation; and wherein said first device is in said identifier assignment state of operation when said signal (spi_csn signal=0) indicating the start of a serial peripheral interface (SPI) transaction is received.

Method Embodiment 3 The method of Method Embodiment 2, further comprising: operating (1420) the first device to generate a signal on a second identifier assignment pin of the first device, said second identifier assignment pin of the first device being coupled to a first identifier assignment pin (enum_in pin) of a second device in the daisy chain of devices.

Method Embodiment 4 The method of Method Embodiment 3, wherein said command used to put devices in an identifier assignment state (e.g., enum_armed state) of operation is a broadcast signal, the method further comprising: operating (1406) the second device in the daisy chain of devices to receive the command used to put devices in an identifier assignment state (e.g., enum_armed state) of operation.

Method Embodiment 5 The method of Method Embodiment 4, further comprising: operating (1422) the second device to detect an amount of time between the start of the SPI transaction and the signal on the first identifier assignment pin (enum_in pin) of the second device received from the first device in the daisy chain of devices; and determining (1424), at the second device, the device identifier assigned to the second device based on the detected amount of time between the start of the SPI transaction and a signal on a first identifier assignment pin (enum_in pin) of the second device.

Method Embodiment 6 The method of Method Embodiment 5, wherein said device identifier assigned to the second device is one number higher than said device identifier assigned to the first device.

Method Embodiment 7 The method of Method Embodiment 5, further comprising: operating the second device (1426) to generate a signal on a second identifier assignment pin of the second device, said second identifier assignment pin being coupled to a first identifier assignment pin (enum_in pin) of a third device in the daisy chain of devices.

Method Embodiment 8 The method of Method Embodiment 7, further comprising: operating (1408) the third device in the daisy chain of devices to receive the command used to put devices in an identifier assignment state (e.g., enum_armed state) of operation at the same time the first and second devices receive the command.

Method Embodiment 9 The method of Method Embodiment 8, further comprising: operating (1428) the third device to detect an amount of time between the start of the SPI transaction and the signal on the first identifier assignment pin (enum_in pin) of the third device received from the second device in the daisy chain of devices; and determining (1430), at the third device, the device identifier assigned to the third device based on the detected amount of time between the start of the SPI transaction and the signal received on the first identifier assignment pin (enum_in pin) of the third device.

Method Embodiment 10 The method of Method Embodiment 9, wherein said device identifier assigned to the third device is one number higher than said device identifier assigned to the second device Method Embodiment 11 The method of Method Embodiment 1, wherein said first and second pins of the first device are CHIP_ID pins of a serial peripheral interface; wherein said signal (spi_csn signal=0) indicating the start of a serial peripheral interface (SPI) transaction is a SPI_CSN signal communicated on an SPI_CSN pin of a SPI interface; and wherein said command (init_enum) used to put devices in an identifier assignment state is communicated in broadcast signal.

NUMBERED LIST OF EXEMPLARY APPARATUS EMBODIMENTS

Apparatus Embodiment 1 An array of devices (701), the array (701) of devices comprising: a first device (702 or 704 or 706 or 1500) including: a first input and output interface (1504) including i) a first input (e.g., spi_csn signal input) (102) configured to receive a signal indicating a start of a serial peripheral interface (SPI) transaction, ii) a first identifier assignment pin (110) and iii) a second identifier assignment pin (112); and a first processor (1502) configured to: detect a signal (spi_csn signal=0) communicated on the first input indicating the start of a serial peripheral interface (SPI) transaction; detect an amount of time between the start of the SPI transaction and a signal on a first identifier assignment pin (enum_in pin) of the first device; and determine the device identifier assigned to the first device based on the detected amount of time between the start of the SPI transaction and a signal on a first identifier assignment pin (enum_in pin) of the first device.

Apparatus Embodiment 2 The array of devices (701) of Apparatus Embodiment 1, further comprising: a second device (704 or 706 or 708 or 1500) including: a second input and output interface (1504) including i) a first input (e.g., spi_csn signal input) (102) configured to receive a signal indicating a start of a serial peripheral interface (SPI) transaction, ii) a first identifier assignment pin (110) coupled to the second identifier assignment pin of the first device and iii) a second identifier assignment pin (112); and a second processor (1502) configured to: detect a signal (spi_csn signal=0) communicated on the first input of the second device indicating the start of a serial peripheral interface (SPI) transaction; detect an amount of time between the start of the SPI transaction and a signal on the first identifier assignment pin (enum_in pin) of the second device; and determine the device identifier assigned to the second device based on the detected amount of time between the start of the SPI transaction and a signal on a first identifier assignment pin (enum_in pin) of the second device.

Apparatus Embodiment 3 The array of devices (701) of Apparatus Embodiment 2, wherein the first device (702 or 704 or 706 or 1500) further includes: a first memory (1508) storing the device identifier (1542) assigned to the first device after the device identifier assigned to the first device is determined.

Apparatus Embodiment 4 The array of devices (701) of Apparatus Embodiment 3, wherein the second device (704 or 706 or 708 or 1500) further includes: a second memory (1508) storing the device identifier (1542) assigned to the second device after the device identifier assigned to the second device is determined. 16.

Numbered List of Exemplary Non-Transitory

Computer Readable Medium Embodiments

Non-Transitory Computer Readable Medium Embodiment 1 A non-transitory computer readable medium (1508) including computer executable instructions which when executed by a processor (1502) of a first device cause the first device (1500) to perform the steps of: detecting (1410), at the first device in a daisy chain of devices, a signal (spi_csn signal=0) indicating the start of a serial peripheral interface (SPI) transaction; operating (1416) the first device to detect an amount of time between the start of the SPI transaction and a signal on a first identifier assignment pin (enum_in pin) of the first device; and determining (1418), at the first device, the device identifier assigned to the first device based on the detected amount of time between the start of the SPI transaction and a signal on a first identifier assignment pin (enum_in pin) of the first device.

The techniques of various embodiments may be implemented using software, hardware and/or a combination of software and hardware. Various embodiments are directed to apparatus and/or systems, e.g., SPI interface devices, chips, array of chips, wireless communications systems, wireless terminals, user equipment (UE) devices, access points, e.g., a WiFi wireless access point, a cellular wireless AP, e.g., an eNB or gNB, user equipment (UE) devices, a wireless cellular systems, e.g., a cellular system, WiFi networks, etc. Various embodiments are also directed to methods, e.g., method of controlling and/or operating a system or device, e.g., a communications system, a SPI interface device, a chip, an array of chips, an access point, a base station, a wireless terminal, a UE device, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments nodes and/or elements described herein are implemented using one or more components to perform the steps corresponding to one or more methods, for example, controlling, establishing, generating a message, message reception, signal processing, sending, communicating, e.g., receiving and transmitting, comparing, making a decision, selecting, making a determination, modifying, controlling determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a SPI interface device, a chip, a device including an array of chips with using a common SPI interface bus, a wireless communications device including a multi-element antenna array supporting beam forming, such as a cellular AP or Wifi AP, a wireless terminal, a UE device, etc., including a processor configured to implement one, multiple or all of the steps of one or more methods of the invention.

In some embodiments, the processor or processors, e.g., CPUs, of one or more devices, are configured to perform the steps of the methods described as being performed by the devices, e.g., communication nodes. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., a SPI interface device, a chip, access point, with a processor which includes a component corresponding to each of the steps of the various described methods performed by the device in which the processor is included. In some but not all embodiments a device, e.g., a SPI interface device, a chip, wireless communications node such as an access point or base station, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a SPI interface device, a chip, an array of chips, a wireless communications device such as an access point. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a SPI interface device, a chip, a wireless communications device such as an access point described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of device identifier assignment, the method comprising:
   detecting, at a first device in a daisy chain of devices, a signal indicating the start of a serial peripheral interface (SPI) transaction;
   operating the first device to detect an amount of time between the start of the SPI transaction and a signal on a first identifier assignment pin of the first device; and
   determining, at the first device, the device identifier assigned to the first device based on the detected amount of time between the start of the SPI transaction and the signal on the first identifier assignment pin of the first device.

2. The method of claim 1, further comprising,
   prior to detecting said signal indicating the start of a serial peripheral interface (SPI) transaction, operating the first device in the daisy chain of devices to receive a command used to put devices in an identifier assignment state of operation; and
   wherein said first device is in said identifier assignment state of operation when said signal indicating the start of a serial peripheral interface (SPI) transaction is received.

3. The method of claim 2, further comprising:
   operating the first device to generate a signal on a second identifier assignment pin of the first device, said second identifier assignment pin of the first device being coupled to a first identifier assignment pin of a second device in the daisy chain of devices.

4. The method of claim 3, wherein said command used to put devices in the identifier assignment state of operation is a broadcast signal, the method further comprising:
   operating the second device in the daisy chain of devices to receive the command used to put devices in the identifier assignment state of operation.

5. The method of claim 4, further comprising:
   operating the second device to detect an amount of time between the start of the SPI transaction and the signal on the first identifier assignment pin of the second device received from the first device in the daisy chain of devices; and
   determining, at the second device, the device identifier assigned to the second device based on the detected amount of time between the start of the SPI transaction and the signal on the first identifier assignment pin of the second device.

6. The method of claim 5, wherein said device identifier assigned to the second device is one number higher than said device identifier assigned to the first device.

7. The method of claim 5, further comprising:
   operating the second device to generate a signal on a second identifier assignment pin of the second device, said second identifier assignment pin being coupled to a first identifier assignment pin of a third device in the daisy chain of devices.

8. The method of claim 7, further comprising:
   operating the third device in the daisy chain of devices to receive the command used to put devices in an identifier assignment state of operation at the same time the first and second devices receive the command.

9. The method of claim 8, further comprising:
   operating the third device to detect an amount of time between the start of the SPI transaction and the signal on the first identifier assignment pin of the third device received from the second device in the daisy chain of devices; and
   determining, at the third device, the device identifier assigned to the third device based on the detected amount of time between the start of the SPI transaction and the signal received on the first identifier assignment pin of the third device.

10. The method of claim 9, wherein said device identifier assigned to the third device is one number higher than said device identifier assigned to the second device.

11. The method of claim 1,
    wherein said first and second pins of the first device are CHIP_ID pins of a serial peripheral interface;
    wherein said signal indicating the start of a serial peripheral interface (SPI) transaction is a SPI_CSN signal communicated on an SPI_CSN pin of a SPI interface; and
    wherein said command used to put devices in an identifier assignment state is communicated in broadcast signal.

12. An array of devices, the array of devices comprising:
    a first device including:
      a first input and output interface including i) a first input configured to receive a signal indicating a start of a serial peripheral interface (SPI) transaction, ii) a first identifier assignment pin and iii) a second identifier assignment pin; and a first processor configured to:
    detect a signal communicated on the first input indicating the start of a serial peripheral interface (SPI) transaction;
    detect an amount of time between the start of the SPI transaction and a signal on a first identifier assignment pin of the first device; and
    determine the device identifier assigned to the first device based on the detected amount of time between the start of the SPI transaction and the signal on the first identifier assignment pin of the first device.

13. The array of devices of claim 12, further comprising:
a second device including:
    a second input and output interface including i) a first input configured to receive a signal indicating a start of a serial peripheral interface (SPI) transaction, ii) a first identifier assignment pin coupled to the second identifier assignment pin of the first device and iii) a second identifier assignment pin; and
    a second processor configured to:
        detect a signal communicated on the first input of the second device indicating the start of a serial peripheral interface (SPI) transaction;
        detect an amount of time between the start of the SPI transaction and a signal on the first identifier assignment pin of the second device; and
        determine the device identifier assigned to the second device based on the detected amount of time between the start of the SPI transaction and the signal on the first identifier assignment pin of the second device.

14. The array of devices of claim 13, wherein the first device further includes:
    a first memory storing the device identifier assigned to the first device after the device identifier assigned to the first device is determined.

15. The array of devices of claim 14, wherein the second device further includes:
    a second memory storing the device identifier assigned to the second device after the device identifier assigned to the second device is determined.

16. A non-transitory computer readable medium including computer executable instructions which when executed by a processor of a first device cause the first device to perform the steps of:
    detecting, at the first device in a daisy chain of devices, a signal indicating the start of a serial peripheral interface (SPI) transaction;
    operating the first device to detect an amount of time between the start of the SPI transaction and a signal on a first identifier assignment pin of the first device; and
    determining, at the first device, the device identifier assigned to the first device based on the detected amount of time between the start of the SPI transaction and the signal on the first identifier assignment pin of the first device.

* * * * *